US008832550B2

(12) United States Patent
Abe

(10) Patent No.: US 8,832,550 B2
(45) Date of Patent: Sep. 9, 2014

(54) ELECTRONIC DICTIONARY DEVICE WITH TOUCH PANEL DISPLAY MODULE AND SEARCH METHOD OF ELECTRONIC DEVICE WITH TOUCH PANEL DISPLAY MODULE

(75) Inventor: Takatoshi Abe, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 27 days.

(21) Appl. No.: 13/298,584

(22) Filed: Nov. 17, 2011

(65) Prior Publication Data

US 2012/0131451 A1 May 24, 2012

(30) Foreign Application Priority Data

Nov. 19, 2010 (JP) ................................. 2010-259309

(51) Int. Cl.
*G06F 17/00* (2006.01)
*G06F 17/24* (2006.01)
*G06F 17/27* (2006.01)
*G06F 3/0488* (2013.01)

(52) U.S. Cl.
CPC .......... *G06F 17/2735* (2013.01); *G06F 17/241* (2013.01); *G06F 3/0488* (2013.01)
USPC ............. 715/259; 715/256; 715/205; 704/10; 704/9; 707/3

(58) Field of Classification Search
USPC .............. 715/205, 256, 259; 704/10, 9; 707/3
See application file for complete search history.

(56) References Cited

U.S. PATENT DOCUMENTS

| 8,145,665 | B2 | 3/2012 | Shinjo et al. | |
| 8,374,849 | B1 * | 2/2013 | Jin et al. | 704/9 |
| 2007/0168182 | A1 * | 7/2007 | Abe | 704/10 |

FOREIGN PATENT DOCUMENTS

| CN | 1932804 A | 3/2007 |
| CN | 101689204 A | 3/2010 |
| JP | 11184854 A | 7/1999 |
| JP | 2000276485 A | 10/2000 |
| JP | 2004-295626 A | 10/2004 |
| JP | 2005018169 A | 1/2005 |
| JP | 2005-189993 A | 7/2005 |
| JP | 2007-257189 A | 10/2007 |

OTHER PUBLICATIONS

Japanese Office Action dated Jun. 10, 2014 in counterpart Japanese Application No. 2010-259309.
"Pocket PC Best Choice", Mobile Press, vol. 4, No. 3, pp. 34-37.
Chinese Office Action dated Jun. 4, 2014 in counterpart Chinese Application No. 201110379116.7.

* cited by examiner

*Primary Examiner* — Quoc A Tran
(74) *Attorney, Agent, or Firm* — Holtz, Holtz, Goodman & Chick PC

(57) ABSTRACT

The electronic dictionary device, when one character in text displayed on a touch panel display module is specified by a cursor operation, retrieves entry words in a dictionary stored in a dictionary storage module in descending order of length of an entry word that matches a series of character strings whose first character is the one character and, when a character string in text displayed on the touch panel display module is specified by a touch operation, retrieves an entry word that matches the specified character string in the text from a dictionary stored in the dictionary storage module, and reads text of an explanation corresponding to the retrieved entry word from the corresponding dictionary and displaying the text on the display module.

10 Claims, 14 Drawing Sheets

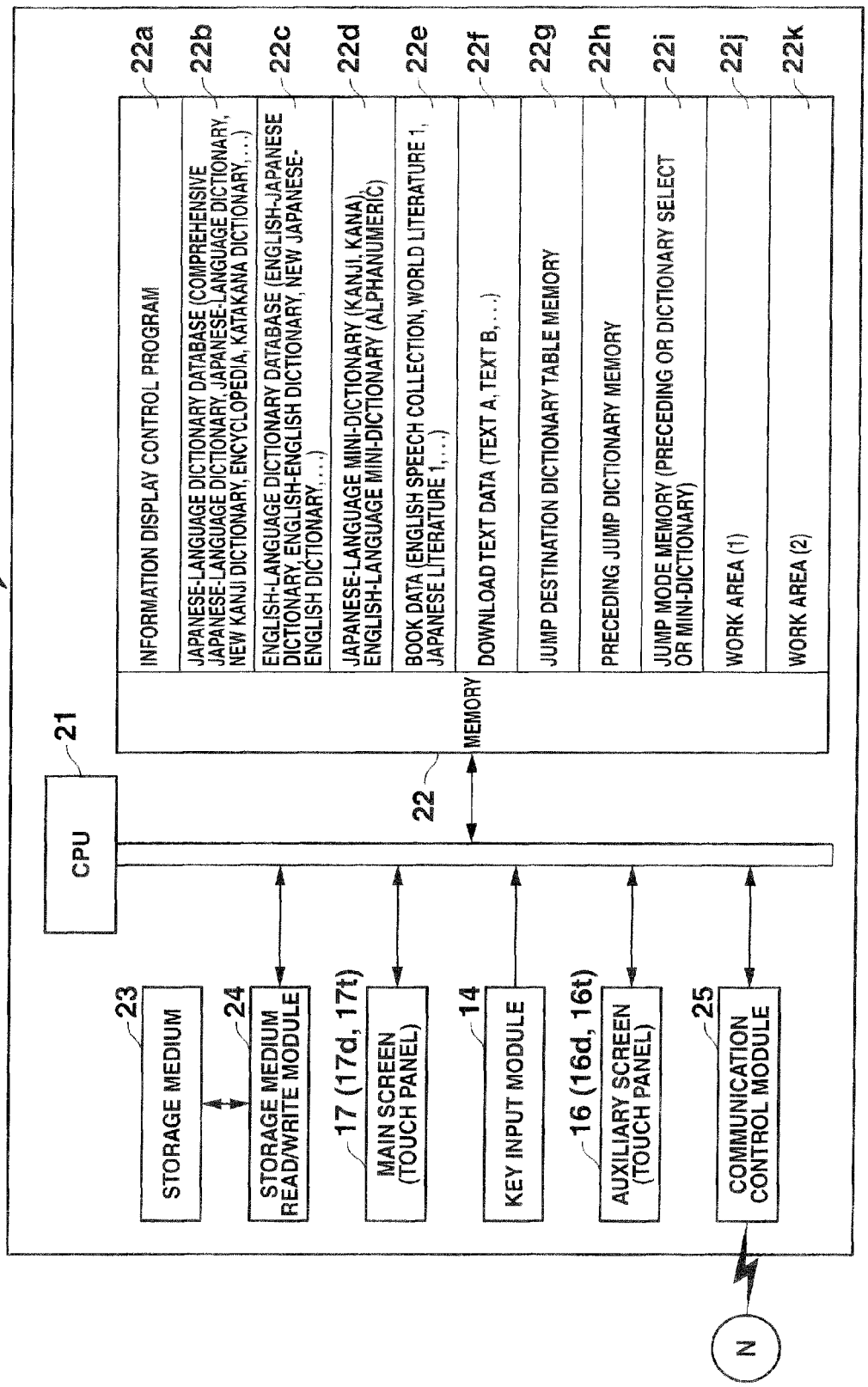

FIG.3

22g JUMP DESTINATION DICTIONARY TABLE

| CHARACTER TYPE | | | DICTIONARY NAME |
|---|---|---|---|
| KANJI | KANA | ALPHANUMERIC | |
| ○ | ○ | | COMPREHENSIVE JAPANESE-LANGUAGE DICTIONARY |
| ○ | ○ | | JAPANESE-LANGUAGE DICTIONARY |
| ○ | | | NEW KANJI DICTIONARY |
| ○ | ○ | ○ | ENCYCLOPEDIA |
| | ○ | | KATAKANA DICTIONARY |
| | | ○ | ENGLISH-JAPANESE DICTIONARY |
| | | ○ | ENGLISH-ENGLISH DICTIONARY |
| ○ | ○ | | NEW JAPANESE-ENGLISH DICTIONARY |

FIG.4

22h PRECEDING JUMP DICTIONARY MEMORY

| CHARACTER TYPE | PRECEDING JUMP DICTIONARY |
|---|---|
| KANJI | COMPREHENSIVE JAPANESE-LANGUAGE DICTIONARY |
| KANA | KATAKANA DICTIONARY |
| ALPHANUMERIC | ENGLISH-JAPANESE DICTIONARY |

ELECTRONIC DICTIONARY DEVICE WITH TOUCH PANEL DISPLAY MODULE AND SEARCH METHOD OF ELECTRONIC DEVICE WITH TOUCH PANEL DISPLAY MODULE

CROSS-REFERENCE TO RELATED APPLICATIONS

This application is based upon and claims the benefit of priority from prior Japanese Patent Application No. 2010-259309, filed Nov. 19, 2010, the entire contents of which are incorporated herein by reference.

BACKGROUND OF THE INVENTION

1. Field of the Invention

This invention relates to an electronic dictionary device with a touch panel display module and a search method of an electronic device with a touch panel display module.

2. Description of the Related Art

A conventional electronic dictionary device has the function of reading explanatory information corresponding to a desired entry word from dictionary data and displaying it on an explanatory information display screen or of reading a desired electronic book and displaying it on a book viewer screen.

Some electronic dictionary devices have a jump search function of specifying the first character in character string to be retrieved from a dictionary with a cursor that moves according to a key operation, retrieving the specified search string from other dictionary data selected by the user on the basis of entry words, and displaying its explanatory information.

The jump search function of the conventional electronic dictionary device is available in two methods: one method is to specify the first character in a character string to be retrieved on a text display screen by cursor key or a stylus touch operation and the other method is to specify a range by a cursor key or a stylus touch operation.

In the method of specifying the first character in a search string, retrieving entry words in descending order of length of an entry word that matches a character string starting with the first character, and displaying the entry words in list form, the operation of specifying search strings is simple, but the operation of selecting a desired entry word is complicated because the number of candidates for the retrieved entry words become large.

In the method of specifying a range of a search string, the operation of specifying the start point and end point, of the range is complicated, but an entry word that matches the range-specified search string is retrieved and displayed swiftly. It is easier to specify a range by touching with a stylus than by using cursors. However, when a range of a search string spanning multiple lines is specified continuously by touching with the stylus, the specifying operation is difficult and troublesome.

BRIEF SUMMARY OF THE INVENTION

An object of an electronic dictionary device with a touch panel display module according to an embodiment of the invention is to make it possible to specify suitably a search string in text, regardless f where it is in text, and retrieve the string.

To achieve the object, an electronic dictionary device according to the embodiment comprises:

a dictionary storage module which stores a dictionary that causes a plurality of entry words to correspond to explanations of the entry words;

a touch panel display module which displays text of explanations in a dictionary stored in the dictionary storage module or another text;

a cursor operation character specify module which specifies one character in text displayed on the touch panel display module according to a cursor operation;

a touch operation character specify module which specifies a character string in text displayed on the touch panel display module according to a touch operation;

a specified operation dictionary search module which, when the cursor operation character specify module specifies one character in the text, retrieves entry words in a dictionary stored in the dictionary storage module in descending order of length of an entry word that matches a series of character strings whose first character is the one character and which, when the touch operation character specify module specifies a character string in the text, retrieves an entry word that matches the specified character string in the text from a dictionary stored in the dictionary storage module; and an explanation text display control module which reads text of an explanation corresponding to an entry word retrieved by the specified operation dictionary search module from the corresponding dictionary and displays the text.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing a configuration of the electronic circuit of the electronic dictionary device 10;

FIG. 3 shows the contents of a jump destination dictionary table memory 22g secured in a memory 22 of the electronic dictionary device 10;

FIG. 4 shows the contents of a preceding jump dictionary memory 22h secured in the memory 22 of the electronic dictionary device 10;

DETAILED DESCRIPTION OF THE INVENTION

Hereinafter, referring to the accompanying drawings, an embodiment of the invention will be explained.

Figure 1:
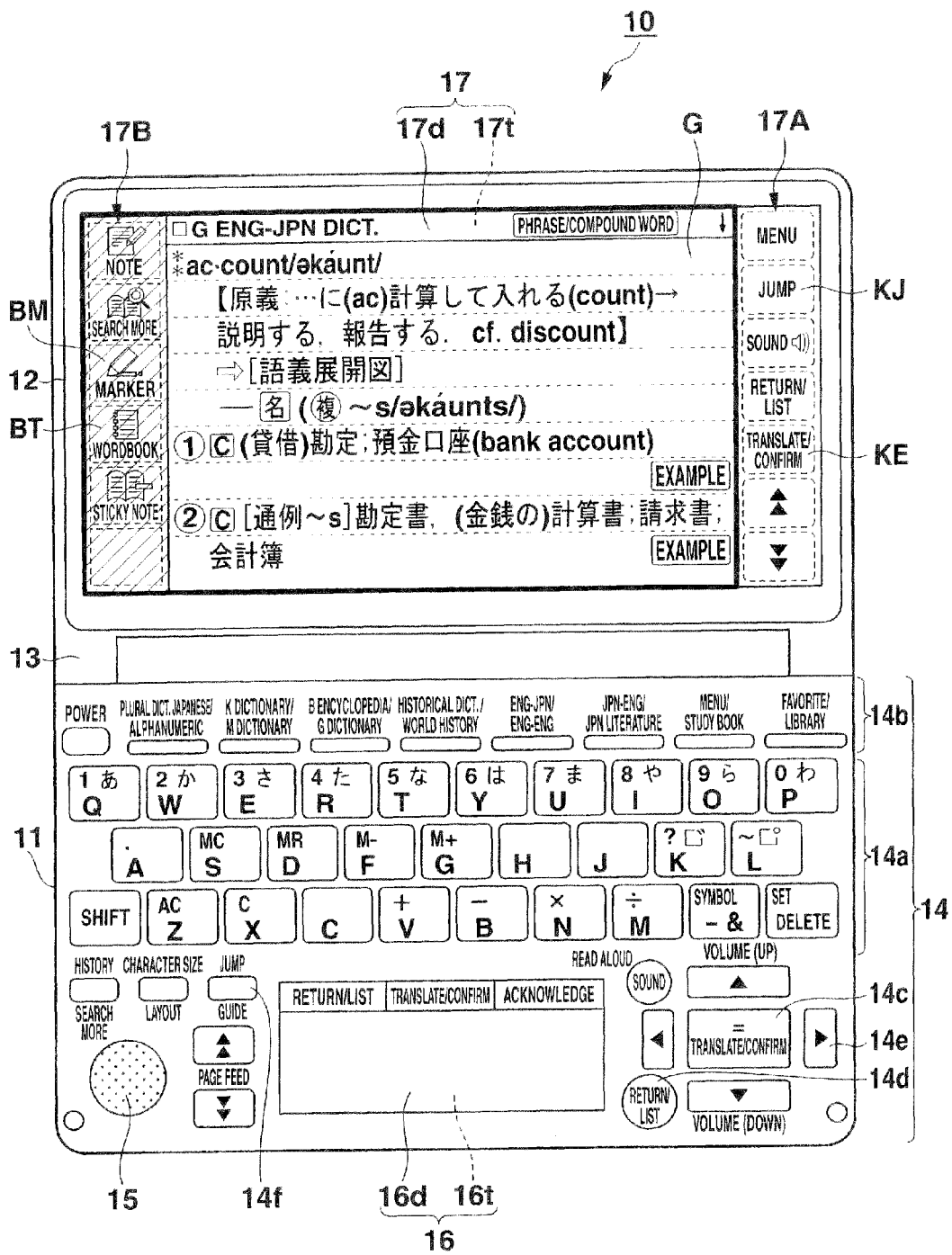
FIG. 1 is a front view showing an outer configuration of an electronic dictionary device 10 according to an embodiment of the invention.

FIG. 1 is a front view showing an outer configuration of an electronic dictionary device 10 according to an embodiment of the invention.

The electronic dictionary device 10 is configured as a portable device dedicated to an electronic dictionary explained below or as a personal digital assistant (FDA), a personal computer (PC), a cellular phone, an electronic book reader, a portable video game console, or the like each of which has a dictionary function.

The electronic dictionary device 10 is so configured that a body case 11 and a cover case 12 are coupled with each other via a hinge part 13 so as to form a foldable case that can be opened and closed. At the surface of the body case 11 with the foldable case opened, there are provided a key input module (keyboard) 14 and a handwriting input module (auxiliary screen) 16. The key input module 14 comprises character input keys 14a, dictionary specify keys 14b, [Translate/Confirm] key 14c, [Return/List] key 14d, cursor keys 14e, [Jump] key 14f, and a speaker 15.

The handwriting input module (auxiliary screen) 16 has a structure where a touch position detecting device that detects a position touched by the user with a stylus, a finger, or the like and a display device are integrally formed. The handwriting input module 16 is so configured that, for example, a transparent touch panel 16t is laid on a 256×64 dot color liquid-crystal display screen 16d on the front side of the central part of the key input module 14. As necessary, the input area of the handwriting input module (auxiliary screen) 16 is switched to a handwriting character (or kanji) input, area for inputting a handwriting character, an icon input area for various functions, a display area for condensed explanatory information read from a mini-dictionary database 22d described later, or an area where those input areas are mixed.

A trace of handwriting input in the handwriting character input area switched from the handwriting input module (auxiliary screen) 16 is echoed back to the color liquid-crystal display screen 16d, which displays the trace.

At the surface of the cover case 12, for example, a 480×320 dot touch panel color display module (main screen) 17 with a backlight is provided on almost all the surface. Like the handwriting input module (auxiliary screen) 16, the touch panel color display module (main screen) 17 has a structure where a display device and a touch position detecting device that detects a position touched by the user with a stylus, a finger, or the like are integrally formed. The touch panel color display module 17 is so configured that a transparent touch panel 17t is laid on a color liquid-crystal display screen 17d.

At the right end of the touch panel color display module (main screen) 17, there is provided a touch key area 17A whose key notation (e.g., [Translate/Confirm] key KE or [Jump] key KJ) is printed and which is configured to enable the pressing of part of the keys in the key input module 14 to be performed by a touch operation.

At the left end of the touch panel color display module (main screen) 17, there is provided a touch icon area 17B where various icons are displayed which enable executable functions to be specified by a touch operation according to the operation mode.

For example, in a normal dictionary search mode in which an entry word in a desired dictionary is retrieved and an explanatory information display screen G on which explanatory information on the entry word and others are displayed is displayed on the touch panel color display module 17, [Marker] icon BM for setting a marker mode that enables an arbitrary range in the explanatory information displayed on the explanatory information display screen G to be traced by a touch operation and highlighted with a color marker and [Wordbook] icon BT for calling up a wordbook in which entry words in the user-specified dictionary classified personally by the user have been registered are displayed in the touch icon area 17B.

Furthermore, for example, as shown in FIGS. 9A and 9S or FIGS. 10B and 10C, in a jump search mode (activated by [Jump] key 14f/[KJ]) in which an arbitrary character string in explanatory information displayed on the explanatory information display screen G is specified by a jump cursor Cu in a cursor operation or a stylus touch operation and a jump is made to another dictionary to search for the specified character string, a jump mode icon BJ is displayed in the touch icon area 17B and on the handwriting input module (auxiliary screen) 16.

The jump mode icon BJ comprises [Preceding Dictionary] icon Bb for specifying the last-used dictionary as a jump destination dictionary according to the type (kanji/kana/Alphanumeric) of the first character in a character string as a jump search target specified by the jump cursor Cu on the explanatory information display screen G, [Dictionary Select] icon Bs for selecting the user-specified dictionary as a jump destination dictionary from the dictionaries that can be searched for according to the type of the first character in the character string as the jump search target, and [Mini-dictionary] icon Bm for specifying as a jump destination dictionary mini-dictionary (condensed dictionary) prepared according to the type of the first character in the character string as the jump search target.

The electronic dictionary device 10 can display previously stored book data or downloaded text data in the form of a book/text viewer screen Gv (see FIGS. 11A to 11J) on the touch panel color display module 17 (in a book/text viewer mode).

An arbitrary character string in the book/text data displayed on the book/text viewer screen Gv can be specified with the jump cursor Cu to make a jump to a dictionary for the specified character string to search for the string (in a jump search mode).

In the jump search mode in the book/text viewer mode, the jump mode icon BJ is displayed only on the handwriting input module (auxiliary screen) 16. On the touch panel color display module 17 on which the book/text viewer screen is displayed, the touch icon area 17B itself is not displayed to secure as much book/text data to be displayed as possible.

Figure 10B:
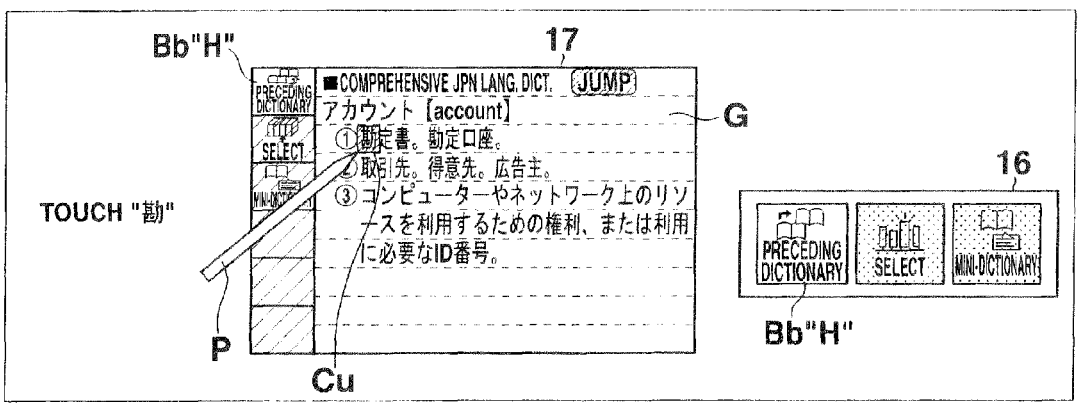
Figure 10C:
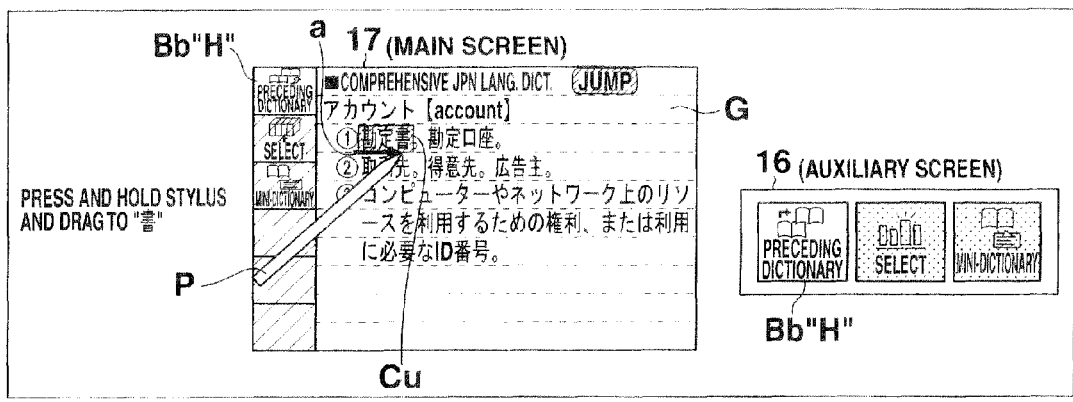
Figure 11A:
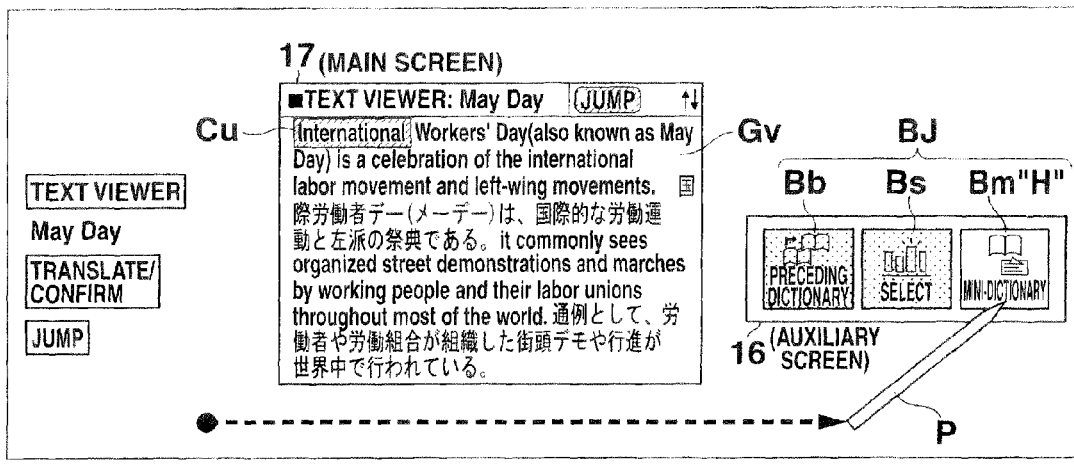
FIGS. 11A, 11B, 11C, 11D, 11E, 11F, 11G, 11H, 11I, and 11J show display operations performed by the touch panel color display module (main screen) 17 and the handwriting input module (auxiliary screen) 16 as a result of an information display process (a jump search in a mini-dictionary mode according to a cursor operation and a stylus touch operation on a book/text viewer screen Gv) at the electronic dictionary device 10.
Figure 11B:
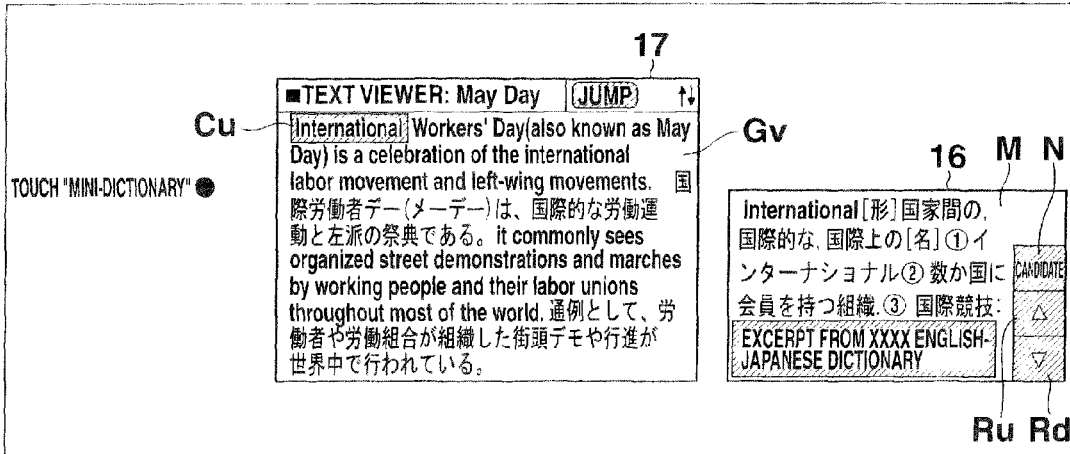

Furthermore, in the jump search mode, when the jump cursor Cu is pointed in a cursor operation to the search character string displayed on the touch panel color display module 17, the jump cursor Cu is displayed in the position of the first character (kana, kanji: see FIGS. 9A and 9B) in the search string or in the position of the first word (Alphanumeric: see FIGS. 11A and 11B). When the search character string is traced by a stylus touch operation, the jump cursor Cu is displayed over the range of the search character string traced with a stylus (see FIGS. 10B and 10C and FIGS. 11E, 11F, and 11G).

FIG. 2 is a block diagram showing a configuration of the electronic circuitry of the electronic dictionary device 10.

The electronic dictionary device 10 is composed of a computer which reads programs recorded in various storage mediums or transferred programs and is controlled by the read programs. The electronic circuitry of the device 10 comprises a central processing unit (CPU) 21.

The CPU 21 controls the operation of each of the various parts of the circuitry according to a device control program prestored in the memory (flash ROM) 22, a device control program read into the memory 22 from an external storage medium 23, such as a ROM card, via a storage medium read/write module 24, or a device control program read into the memory 22 from a Web server (in this case, a program server) on the Internet N via the communication control module 25.

The device control program stored in the memory is activated in response to an input signal corresponding to a user operation from the key input module 14, handwriting input module (auxiliary screen) 16, and touch panel color display module (main screen) 17, a communication signal with each Web server on the Internet N connected via the communication control module 25, or a connection communication signal with a memory card (storage medium) 23, such as an EEPROM, a RAM, or a ROM externally connected via the storage medium read/write module 24.

Connected to the CPU 21 are the memory 22, storage medium read/write module 24, communication control module 25, key input module 14, handwriting input module (auxiliary screen) 16, touch panel color display module (main screen) 17, and others.

Stored as the device control program in the memory 22 are a system program that supervises the operation of the entire electronic dictionary device 10 and a communication program for performing data communication with each Web server on the Internet N via the communication control module 25 or with a user personal computer (PC) (not shown).

Further stored as the device control program are various information display control programs 22a for controlling overall processes based on dictionary databases 22b to 22d and book/text data 22e, 22f stored in the main memory 22, including an entry word search process for retrieving an entry word according to the input of a search character string, the process of reading and displaying explanatory information (including translation and word meaning) corresponding to a retrieved entry word, and a jump search process for specifying an arbitrary character string in the displayed text and making a jump to another dictionary to retrieve the specified character string.

As the dictionary databases 22b to 22d, a Japanese-language database 22b, an English-language database 22c, a mini-dictionary database 22d are previously stored or downloaded and stored.

Stored in the Japanese-language database 22b are [Japanese-language Dictionary] where Japanese explanatory information is written so as to correspond to the kanji/kana entry words, a [Kanji Dictionary] where Japanese explanatory information is written so as to correspond to the kanji entry words, an [Encyclopedia] where Japanese explanatory information is written so as to correspond to the kanji/kana/Alphabetical entry words, and the like.

Stored in the English-language database 22c are [English-Japanese Dictionary] where Japanese explanatory information is written so as to correspond to Alphabetical entry words, an [English-English Dictionary] where English-language explanatory information is written so as to correspond to Alphabetical entry words, and a [Japanese-English Dictionary] where English-language explanatory information is written so as to correspond to the kanji/kana entry words, and the like.

[Japanese-language Mini-dictionary] and [English-language Mini-dictionary] are stored in the mini-dictionary database 22d, [Japanese-language Mini-dictionary] and [English-language Mini-dictionary] are compiled so as to abridge explanatory information on the entry words of the individual dictionaries stored in the Japanese-language dictionary database 22b and English-language dictionary database 22c by omitting information in the parentheses included in the explanatory information and others to leave only main information.

Specifically, the [Japanese-language Mini-dictionary] includes various mini-dictionaries which have been compiled from [Comprehensive Japanese-language Dictionary], [Japanese-language Dictionary], [New Kanji Dictionary], [Encyclopedia], [Katakana Dictionary], and [New Japanese-English Dictionary] which have kanji/kana entry words stored in the Japanese-language dictionary database 22b and English-language dictionary database 22c. The [English-language Mini-dictionary] includes various mini-dictionaries which have been compiled from [Encyclopedia], [English-Japanese Dictionary], and [English-English Dictionary] which have Alphabetical entry words stored in the Japanese-language dictionary database 22b and English-language dictionary database 22c.

As book data 22e, [English speech collection], [The complete series of world literature], [The complete series of Japanese literature], and the like written in English or Japanese are stored.

As text data 22f, various text data items A, B, . . . are downloaded and stored.

In the memory 22, a jump destination dictionary table memory 22q, a preceding jump dictionary memory 22h, a jump mode memory 22i, a work area (1) 22j, a work area (2) 22k, and others are secured.

FIG. 3 shows the contents of the jump destination dictionary table memory 22g secured in the memory 22 of the electronic dictionary device 10.

In the jump destination dictionary table memory 22g, the character types that allow entry words to be searched for in the dictionaries in the Japanese-language dictionary database 22b and English-language dictionary database 22c are stored so as to correspond to the dictionaries.

A jump destination dictionary that enables entry word search according to the character type of a search character string specified by the jump cursor Cu on the explanatory information display screen G (see FIGS. 9A, 9B, 10A, 10B, 10C) or book/text viewer screen Gv (see FIG. 11A to FIG. 11J) is identified on the basis of table data stored in the jump destination dictionary table memory 22g.

FIG. 4 shows the contents of the preceding jump dictionary memory 22h secured in the memory 22 of the electronic dictionary device 10.

In the preceding jump dictionary memory 22h, the dictionary name of a dictionary used as a jump destination dictionary in the jump search mode is updated and stored for each character type of the search character string each time a jump search process is performed.

The jump destination dictionary used last time according to the character type of the search character string specified by the jump cursor Cu in a new jump search mode is identified on the basis of the dictionary name in each character type stored in preceding jump dictionary memory 22h.

The jump mode memory 22i stores the type of a jump mode selected according to the jump mode icons BJ (preceding dictionary icon Bb/dictionary select icon Bs/mini-dictionary icon Bm) displayed in the touch icon area 17B of the touch panel color display module (main screen) 17 or on the handwriting input module (auxiliary screen) 16 when the jump search mode is activated.

The work area (1) 22j and work area (2) 22k store data required to be stored temporarily in various dictionary search processes or in an information display process involving a jump search.

Next, an information display function involving jump search of the electronic dictionary device 10 configured as described above will be explained.

Figure 5:
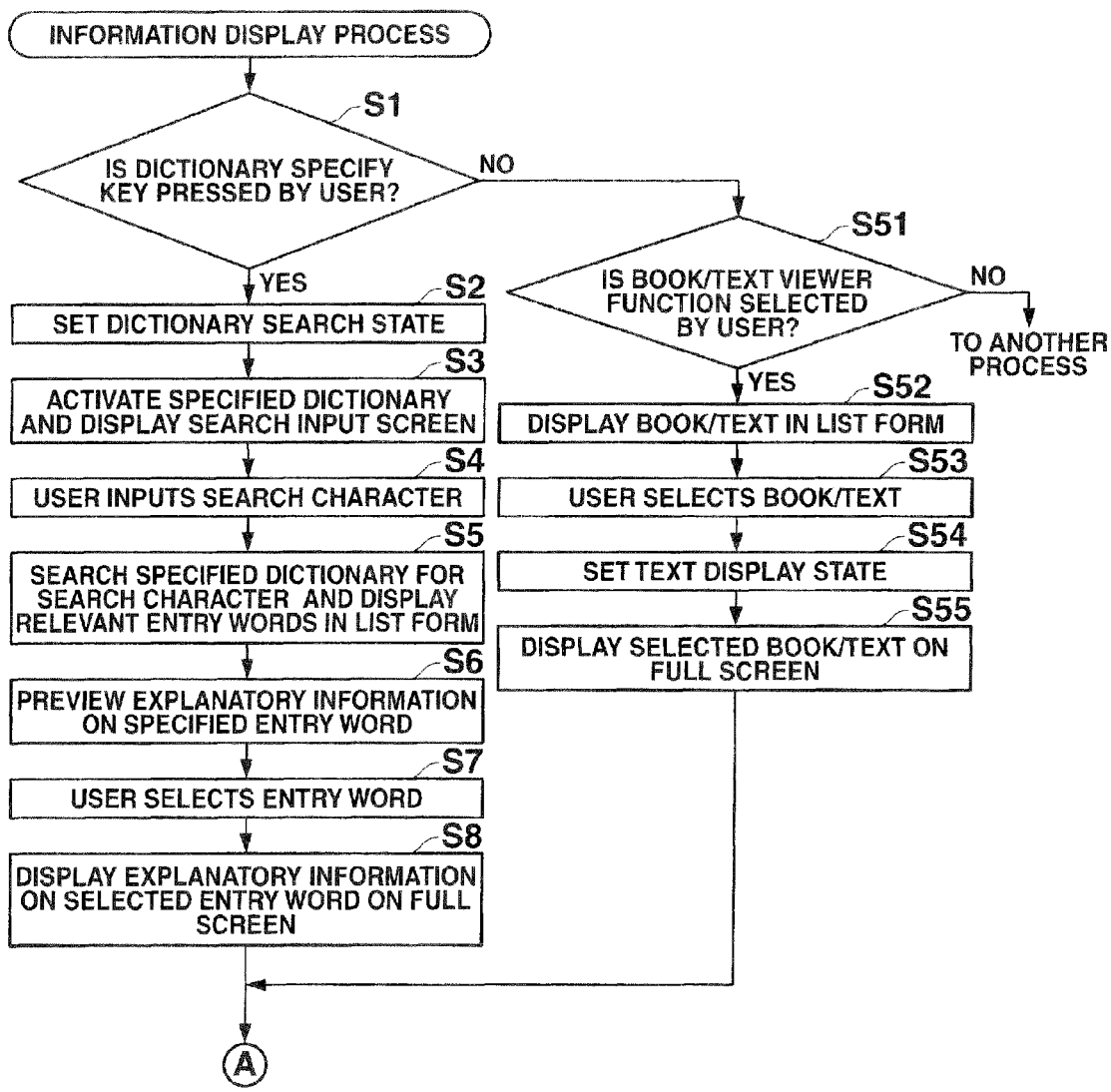
FIG. 5 is a flowchart (part 1) to explain an information display process performed by the electronic dictionary device 10.

FIG. 5 is a flowchart (part 1) to explain an information display process performed by the electronic dictionary device 10.

Figure 6:
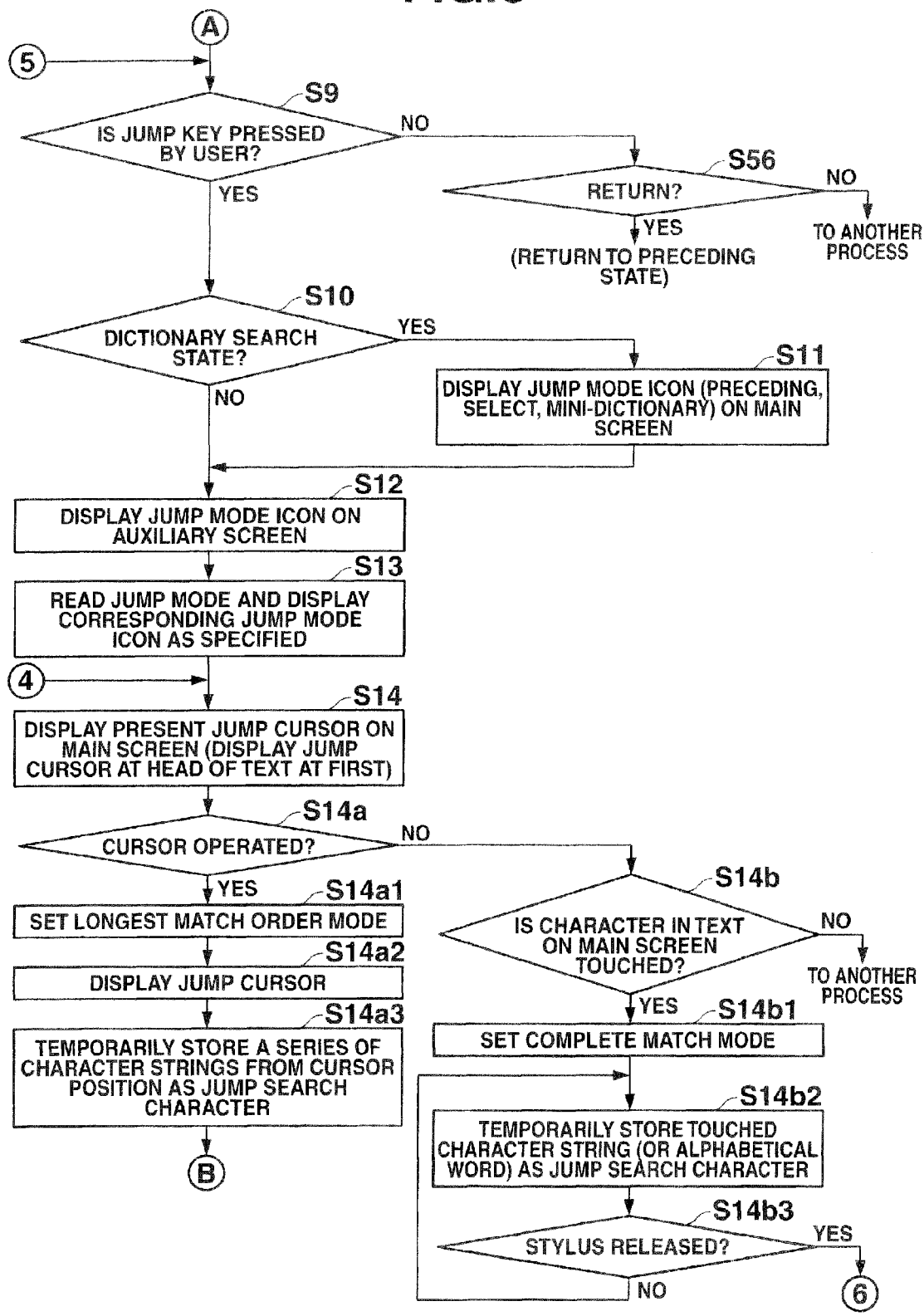
FIG. 6 is a flowchart (part 2) to explain the information display process performed by the electronic dictionary device 10.

FIG. 6 is a flowchart (part 2) to explain the information display process performed by the electronic dictionary device 10.

Figure 7:
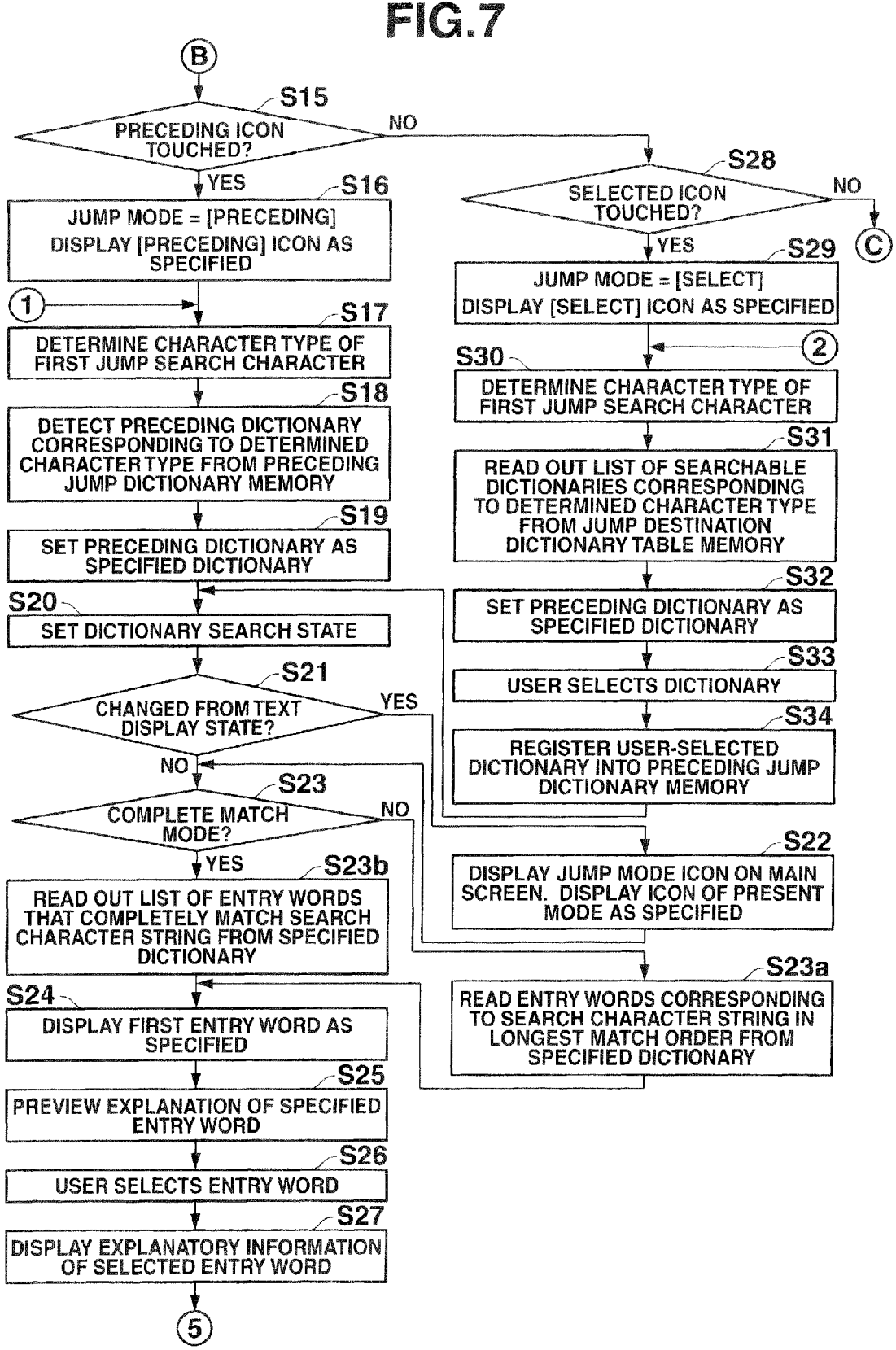
FIG. 7 is a flowchart (part 3) to explain the information display process performed by the electronic dictionary device 10.

FIG. 7 is a flowchart (part 3) to explain the information display process performed by the electronic dictionary device 10.

Figure 8:
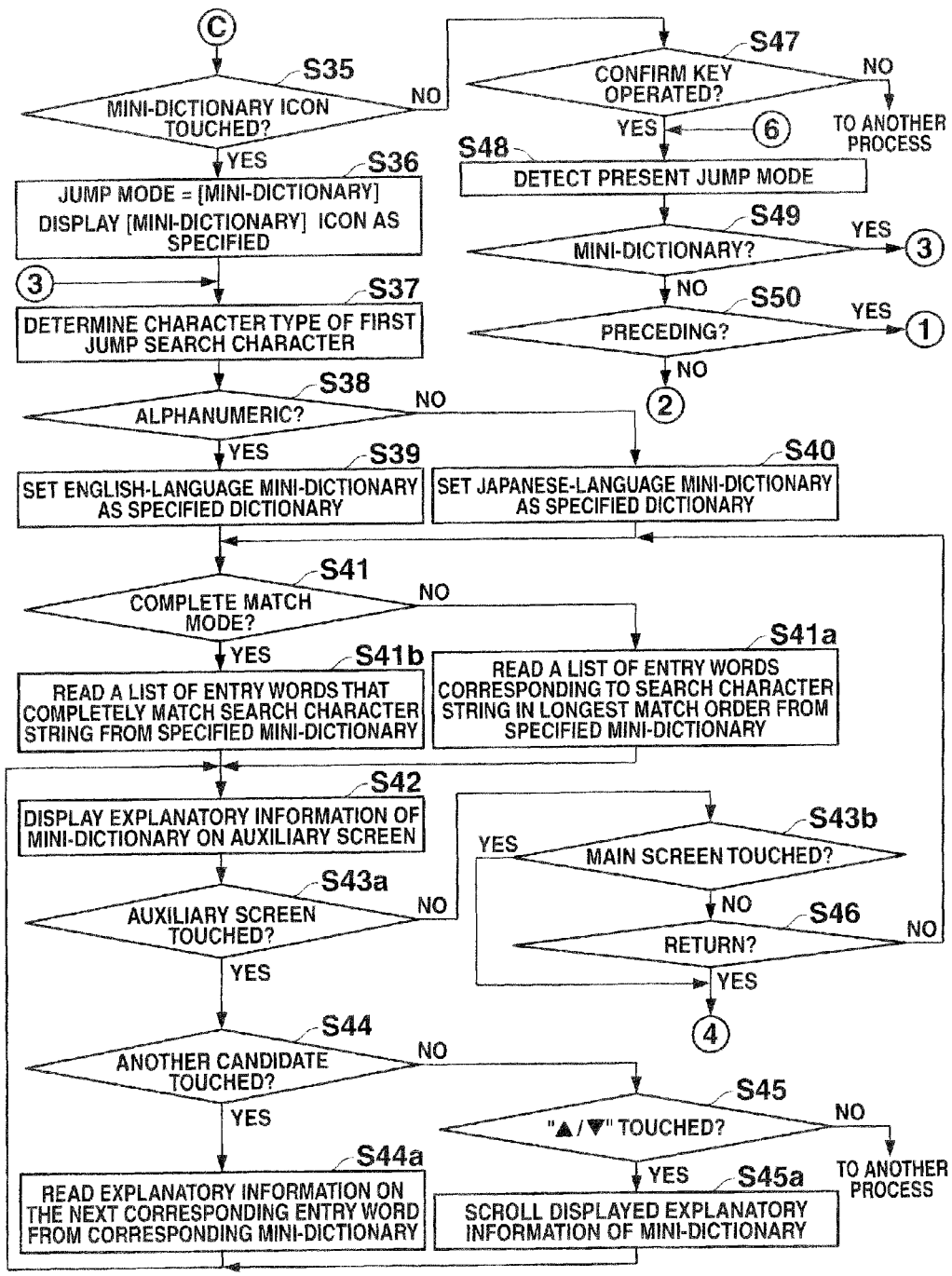
FIG. 8 is a flowchart (part 4) to explain the information display process performed by the electronic dictionary device 10.

FIG. 8 is a flowchart (part 4) to explain the information display process performed by the electronic dictionary device 10.

[Jump search according to a cursor operation on the explanatory information display screen G]

When a desired dictionary is specified by the user by pressing the dictionary specify key 14b (Yes in step S1), the normal dictionary search mode is set (step S2), not only activating the specified dictionary in the dictionary databases 22b, 22c but also displaying a search character string input screen on the touch panel color display module 17 (step S3).

On the search character string input screen, when a desired search character string is input by the user by pressing the character input keys 14a (step S4), entry words that forward match the input search character string are retrieved from the specified dictionary and the retrieved entry words are displayed in list form in an entry word list area Lm (e.g., see FIG. 9C) of the touch panel color display module 17 (step S5).

Then, explanatory information on an entry word highlighted for specified display h by a cursor operation in the search entry words displayed in list form in the entry word list area Lm is read from the specified dictionary and previewed in a preview area Vp (e.g., see FIG. 9C) of the touch panel color display module 17 (step S6).

Then, the desired search entry word is selected by the user moving the cursor Cu. When the user presses (or touches) [Translate/Confirm] key 14c (KE) (step S7), explanatory information read from the specified dictionary according to the selected entry word is displayed on the explanatory information display screen G (e.g., see FIG. 9A) spread over the full screen of the touch panel color display module 17 (step S8).

Figure 9A:
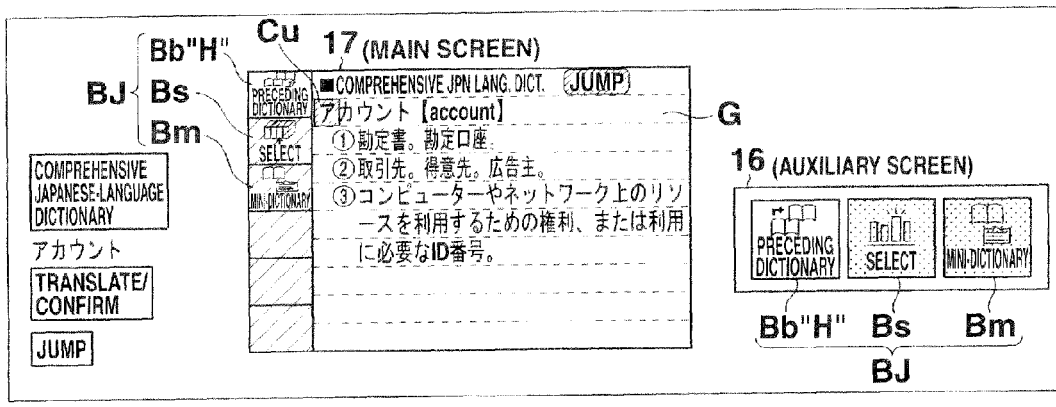
FIGS. 9A, 9B, and 9C show display operations performed by a touch panel color display module (main screen) 17 and a handwriting input module (auxiliary screen) 16 as a result of an information display process (a jump search in a preceding dictionary mode according to a cursor operation on an explanatory information display screen G) at the electronic dictionary device 10.
Figure 9B:
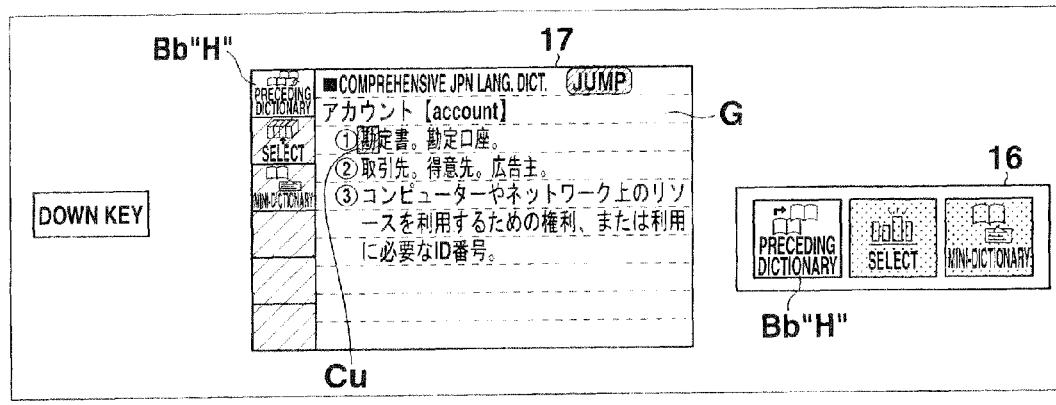
Figure 9C:
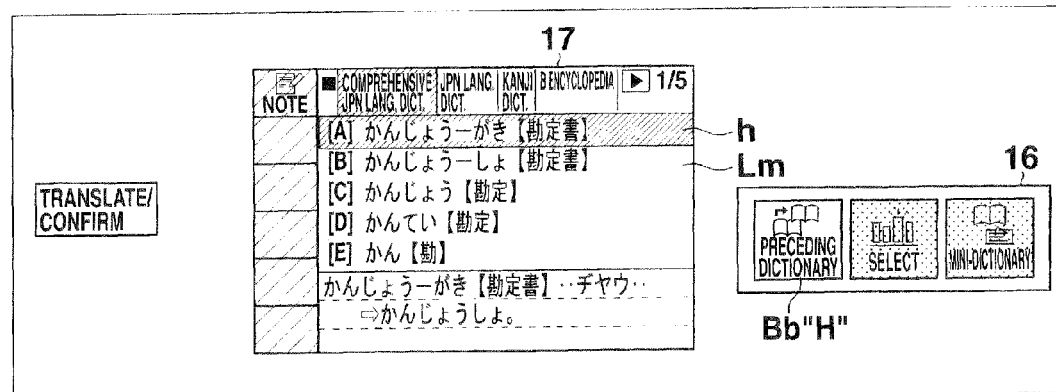

FIGS. 9A, 9B, and 9C show display operations performed by the touch panel color display module (main screen) 17 and handwriting input module (auxiliary screen) 16 as a result of an information display process (a jump search in the preceding dictionary mode according to a cursor operation on the explanatory information display screen G) at the electronic dictionary device 10.

For example, as shown in FIG. 9A, with the explanatory information display screen G corresponding to an entry word "アカウント" (pronounced "a-ka-u-n-to" in Japanese) retrieved from [Comprehensive Japanese-language Dictionary] stored in the Japanese-language dictionary database 22b being displayed on the touch panel color display module (main screen) 17, when [Jump] key 14f (KJ) is pressed (or touched) to make a jump to another dictionary to search for an arbitrary character string in the explanatory information (Yes in step S9), it is determined whether the mode is the normal dictionary search mode (step S10).

If it is determined that the mode is the normal dictionary search mode (Yes in step S10), the jump mode icons BJ (preceding dictionary icon Bb/dictionary select icon Bs/mini-dictionary icon Bm) are displayed in the touch icon area 17B of the touch panel color display module 17 (hereinafter referred to as the "main screen 17") and on the handwriting input module 16 (hereinafter referred to as the "auxiliary screen 16") and the jump search mode is set (steps S11, S12).

Then, the jump search mode (default preceding dictionary mode) stored in the jump mode memory 22i is read and the corresponding [Preceding Dictionary] icon Bb is highlighted for specified display H (step S13).

Then, the jump cursor Cu is displayed at the head of text displayed on the main screen 17 (in this case, the first character "ア" (pronounced "a" in Japanese) on the explanatory information display screen G) (step S14).

Here, when a search character string "勘定書" (pronounced "kan-jou-qaki" in Japanese) in the second line of text displayed on the main screen 17 is to be jump searched for in the preceding dictionary mode, if cursor key [↓] 14e is operated (Yes in step S14a) as shown in FIG. 9B, a longest length match order search mode is set (step S14a1) and the jump cursor Cu is moved to the first character "勘" (pronounced "kan" in Japanese) in the second line of the text and displayed there (step S14a2).

Then, a series of character strings "勘定書 . . . " from the position of the jump cursor Cu forward is stored temporarily as a jump search character string in the work area (1) 22j (step S14a3).

Here, as shown in FIG. 9C, when [Translate/Confirm] key 14c (Kb) is pressed (or touched) (Yes in step S47), the jump search mode stored in the jump mode memory 22i is read (step S48) and it is determined that the present jump search mode is the preceding dictionary mode (Yes in step S50).

When the present jump search mode is not the preceding dictionary mode, if [Preceding Dictionary] icon Bb is touched instead of [Translate/Confirm] key 14c (Kb) (Yes in step S15), the jump search mode is set to the preceding dictionary mode, which is then stored in the jump mode memory 22i. At the same time, the [Preceding Dictionary] icon Bb is highlighted for specified display H (step S16).

Then, the first character type (kanji) of the search character string "勘定書" (pronounced "kan-jou-gaki" in Japanese) is determined (step S17) and the preceding jump destination dictionary [Comprehensive Japanese-language Dictionary] corresponding to the relevant character type (kanji) stored in the preceding jump dictionary memory 22h (see FIG. 4) is detected (step S18). Then, this preceding jump destination dictionary [Comprehensive Japanese-language Dictionary] is set as the current jump destination dictionary (step S19).

Then, the normal dictionary search mode is set (step S20) and it is determined whether the mode has been changed from the book/text viewer mode (step S21).

Then, after it has been determined that the mode has not been changed from the book/text viewer mode (No in step S21), if it is determined that the mode is the longest match order search mode, not the complete match search mode (No in step S23), entry words are retrieved from the [Comprehensive Japanese-language Dictionary] set as the current jump destination dictionary in descending order of length of an entry word that matches the search character string "勘定書" (pronounced "kan-jou-gaki" in Japanese) and a list of retrieved entry words is displayed in the entry word list area Lm of the main screen 17 (step S23a).

At this time, the first entry word "かんじょう-がき [勘定書]" (pronounced "kan-jou-gaki" in Japanese) displayed in list form in the entry word list area Lm is specified and displayed h (step S21) and explanatory information corresponding to the entry word "かんじょう-がき [勘定書]" specified and displayed h is read from the jump destination dictionary [Comprehensive Japanese-language Dictionary] and is previewed in the preview area Vp of the main screen 17 (step S25).

Then, when the user selects a desired search entry word (in FIG. 9C, "かんじょう-がき [勘定書]" [pronounced "kan-jou-gaki" in Japanese]) by operating the cursor keys 14e and presses (or touches) [Translate/Confirm] key 14c (KE) (step S26), detailed explanatory information read from the [Comprehensive Japanese-language Dictionary] according to the selected entry word "かんじょう-がき [勘定書]" is displayed on the explanatory information display screen G spread over the full screen of the main screen 17 (step S27).

As shown in FIG. 9A, when [Jump] key 14f (KJ) is pressed (or touched) (Yes in step S9) and the jump mode icons BJ (preceding dictionary icon Bb/dictionary select icon Bs/mini-dictionary icon Bm) are displayed in the touch icon area 17b of the main screen 17 and on the auxiliary screen 16 (steps S10 to S12), if the jump search mode stored in the jump mode memory 22i is the dictionary select mode, the corresponding [dictionary select] icon Bs in the jump mode icons BJ is highlighted for specified display H (step S13).

Then, as shown in SIC. 95, after the jump cursor Cu on text displayed on the main screen 17 is moved to the head of the desired search character string "勘定書" according to the operation of the cursor key 14e and a series of character strings "勘定書 . . . " from the position of the cursor Cu is stored as a jump search character string temporarily in the work area (1) 22j (steps S14 to S14a3), when [Translate/Confirm] key 14c (KE) is operated (Yes in step S47), it is detected that the current jump search mode is the dictionary select mode (step S48) and it is determined that the mode is neither mini-dictionary mode nor preceding dictionary mode (S49 [No]→S50 [No]) and control proceeds to processes in the dictionary select mode (step S30 and forward).

With the preceding dictionary mode or mini-dictionary mode being set, after the jump cursor Cu on text displayed on the main screen 17 is moved to the head of the desired search character string "勘定書" according to the operation of the cursor key 14e and a series of character strings "勘定書 . . . " from the position of the cursor Cu is stored as a jump search character string temporarily in the work area (1) 22j as shown in FIG. 9B (steps S14 to S14a3), when [dictionary select] icon Bs is touched to select an arbitrary dictionary as a jump destination dictionary (Yes in step S28), the jump search mode is set to the dictionary select mode and stored in the jump mode memory 22i and, at the same time, the [dictionary select] icon Bs is highlighted for specified display H (step S29) and control goes to processes in the dictionary select mode (step S30 and forward).

Then, the first character type (kanji) of the search character string "勘定書" is determined (step S30), and a list of searchable dictionaries corresponding to the determined character type (kanji) is read on the basis of the table data (see FIG. 3) stored in the jump destination dictionary table memory 22g and displayed in a jump destination dictionary list area (not shown) opened on the explanatory information display screen G (step S31).

At this time, the preceding jump destination dictionary corresponding to the character type (kanji) stored in the preceding jump dictionary memory 22h (see FIG. 4) is set as a specified dictionary and is specified and displayed with the cursor Cu (step S32).

Then, in the jump destination dictionary list area (not shown), when the cursor Cu is moved according to a user operation to select a desired jump destination dictionary (e.g., [Comprehensive Japanese-language Dictionary]) and [Translate/Confirm] key 14c (KE) is pressed (or touched) (step S33), the selected dictionary name [Comprehensive Japanese-language Dictionary] is caused to correspond to the determined character type (kanji) of the search character string "勘定書" in the preceding jump dictionary memory 22h (see FIG. 4) and is registered (step S34).

Then, entry words are retrieved from the selected [Comprehensive Japanese-language Dictionary] in descending order of length of an entry word that matches the search character string "勘定書" (steps S20, S21 [No]→S23 [No]→S23a) and a list of the retrieved entry words is displayed in the entry word list area Lm of the main screen 17 (step S23a) as shown in FIG. 9C.

At this time, the first entry word "かんじょう-がき [勘定書]" displayed in list form in the entry word list area Lm is specified and displayed h (step S24) and explanatory information corresponding to the entry word "かんじょう-がき [勘定書]" specified and displayed h is read from the jump destination dictionary [Comprehensive Japanese-language Dictionary] and is previewed in the preview area Vp of the main screen 17 (step S25).

Then, when the user selects a desired search entry word (in FIG. 9C, "かんじょう-がき [勘定書]") by operating the cursor keys 14e and presses (or touches) [Translate/Confirm] key 14c (KE) (step S26), detailed explanatory information read from the [Comprehensive Japanese-language Dictionary] according to the selected entry word "かんじょう-がき [勘定書]" is displayed on the explanatory information display screen C spread over the full screen of the main screen 17 (step S27).

As described above, when the preceding dictionary mode (or dictionary select mode) is set for the desired character string "勘定書" (pronounced "kan-jou-gaki" in Japanese) in the explanatory information display screen G (text) displayed on the main screen 17, the jump cursor Cu is moved to the first character "勘'" (pronounced "kan" in Japanese) in the search character string by operating the cursor keys 14e, and [Translate/Confirm] key 14c is operated, entry words are retrieved from the jump destination dictionary (or the user-selected jump destination dictionary) [Comprehensive Japanese-language Dictionary] used in the preceding jump search process according to the character type of the search character string in descending order of length of an entry word that matches the search character string "勘定書" and are displayed in list form in the entry word list area Lm. Then, when the desired entry word "かんじょう-がき[勘定書]" is selected from the entry word list area Lm, specified, and displayed h, and [Translate/Confirm] key 14c is operated, detailed explanatory information on the search entry word "かんじょう-がき[勘定書]" is read from the jump destination dictionary [Comprehensive Japanese-language Dictionary] and displayed as a new explanatory information display screen C.

Therefore, when the user wants to know a detailed meaning of a phrase (search character string) in the displayed text in the same manner as in the preceding jump search process or from a dictionary selected by the user, the user has only to set the preceding dictionary mode or dictionary select mode, move the jump cursor Cu to the head of the phrase, and operate [Translate/Confirm] key 14c, enabling a user-friendly jump search to be made without difficulty when the phrase partially constitutes a line, and particularly when the phrase spans multiple lines.

[Jump search according to a stylus touch operation on the explanatory information display screen G]

FIGS. 10A, 10B, 10C, and 10D show display operations performed by the touch panel color display module (main screen) 17 and the handwriting input module (auxiliary screen) 16 as a result of an information display process (a jump search in the preceding dictionary mode according to a stylus touch operation on the explanatory information display screen G) at the electronic dictionary device 10.

Figure 10A:
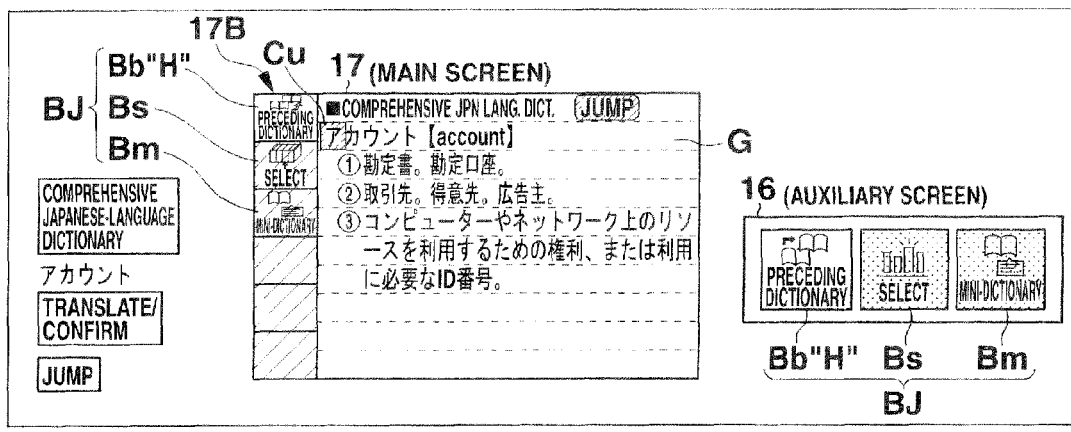
FIGS. 10A, 10B, 10C, and 10D show display operations performed by the touch panel color display module (main screen) 17 and the handwriting input module (auxiliary screen) 16 as a result of an information display process (a jump search in the preceding dictionary mode according to a stylus touch operation on the explanatory information display screen G) at the electronic dictionary device 10.

For example, as shown in FIG. 10A, with the explanatory information display screen G corresponding to an entry word "アカウント" (pronounced "a-ka-u-n-to" in Japanese) retrieved from [Comprehensive Japanese-language Dictionary] stored in the Japanese-language dictionary database 22b being displayed on the main screen 17 as a result of the dictionary search processes in steps S1 to S8, when [Jump] key 14f(KJ) is pressed (or touched) to make a jump to another dictionary to search for an arbitrary character string in the explanatory information (Yes in step S9), it is determined whether the mode is the normal dictionary search mode (step S10).

If it is determined that the mode is the normal dictionary search mode (Yes in step S10), the jump mode icons BJ (preceding dictionary icon Bb/dictionary select icon Bs/mini-dictionary icon Bm) are displayed in the touch icon area 17B of the main screen 17 and on the auxiliary screen 16 and the jump search mode is set (steps S11, S12).

Then, the jump search mode (default preceding dictionary mode) stored in the jump mode memory 22i is read and the corresponding [Preceding Dictionary] icon Bb in the jump mode icons BJ is highlighted for specified display H (step S13).

Then, the jump cursor Cu is displayed at the head of text displayed on the main screen 17 (in this case, the first character "ア" on the explanatory information display screen G (step S14).

Here, when a search character string "勘定書 (pronounced "kan-jou-gaki" in Japanese) in the second line of text displayed on the main screen 17 is to be jump searched for in the preceding dictionary mode, if the range of the search character string "勘定書" is touched with a stylus P as shown by arrow a in FIGS. 10B and 10C, causing the jump cursor Cu to be displayed over the range (Yes in step S14b), a complete match search mode is set (step S14b1) and a series of character strings "勘定書" touched with the stylus is held temporarily as a jump search character string in the work area (1) 22j (step S14b2).

Figure 10D:
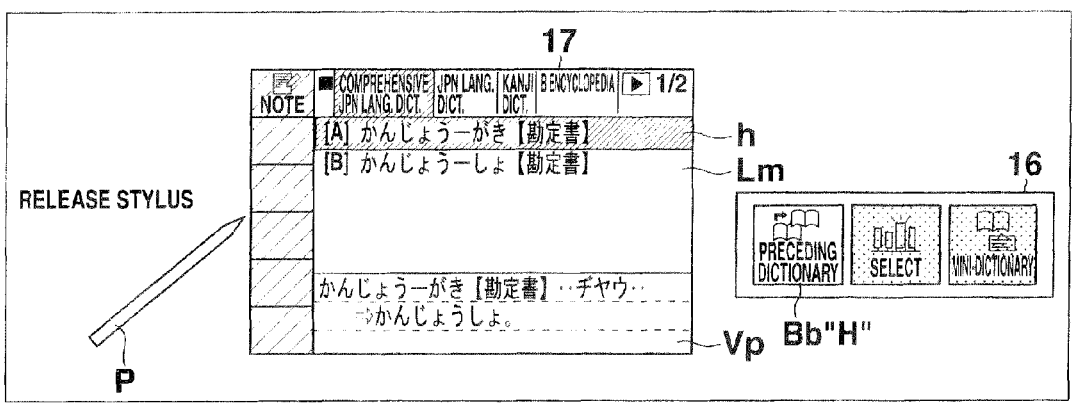

Then, as shown in FIG. 10D, when the stylus P is released from the main screen 17 (Yes in step S14b3), the jump search mode stored in the jump mode memory 22i is read (step S48) and it is determined that the present jump search mode is the preceding dictionary mode (Yes in step S50).

Then, the first character type (kanji) of the search character string "勘定書" is determined (step S17) and the preceding jump destination dictionary [Comprehensive Japanese-language Dictionary] corresponding to the character type (kanji) stored in the preceding jump dictionary memory 22h (see FIG. 4) is detected (step S18). Then, the preceding jump destination dictionary [Comprehensive Japanese-language Dictionary] is set as the current jump destination dictionary (step S19).

Then, the mode is set to the normal dictionary search mode (step S20) and it is determined whether the mode has been changed from the book/text viewer mode (step S21).

After it has been determined that the mode has not been changed from the book/text viewer mode (No in step S21), if it is determined that the mode is the complete match search mode (Yes in step S23), entry words that completely match the search character string "勘定書" (pronounced "kan-jou-gaki" in Japanese) are retrieved from the [Comprehensive Japanese-language Dictionary] set as the preceding jump destination dictionary and a list of the retrieved entry words is displayed in the entry word list area Lm of the main screen 17 (step S23b)

At this time, the first entry word "かんじょう-がき [勘定書]" displayed in list form in the entry word list area Lm is specified and displayed h (step S24) and explanatory information corresponding to the entry word "かんじょう-がき[勘定書]" specified and displayed is read from the jump destination dictionary [Comprehensive Japanese-language Dictionary] and is previewed in the preview area Vp of the main screen 17 (step S25).

Then, when the user selects the desired search entry word (in FIG. 10D, "かんじょう-がき[勘定書]") by operating the cursor keys 14e and presses (or touches) [Translate/Confirm] key 14c (KE) (step S26), detailed explanatory information read from the [Comprehensive Japanese-language Dictionary] according to the selected entry word "かんじょう-がき[勘定書]" is displayed on the explanatory information display screen G spread over the full screen of the main screen 17 (step S27).

As shown in FIG. 10A, when [Jump] key 14f (KJ) is pressed (or touched) (Yes in step S9) and the jump mode icons BJ are displayed in the touch icon area 17B of the main screen. 17 and on the auxiliary screen 16 (steps S10 to S12), if the jump search mode stored in the jump mode memory 22*i* is the dictionary select mode, the corresponding [dictionary select] icon Bs in the jump mode icons BJ is highlighted for specified display H (step S13).

Then, as shown by arrow a in FIGS. 10B and 10C, when the jump cursor Cu is displayed in the range of the desired search character string "勘定書" in text shown on the main screen 17 according to a stylus touch operation, the series of character strings "勘定書" touched with the stylus is stored as a jump search character string temporarily in the work area (1) 22*j* (steps S14 to S14*b*2), and then the stylus is released from the screen (Yes in step S14*b*3), it is detected that the present jump search mode is the dictionary select mode (step S48) and control is passed to processes in the dictionary select mode (step S30 and forward) because it has been determined that the mode is neither the mini-dictionary mode nor the preceding dictionary mode (step S49 [No]→step S50 [No]).

Then, the first character type (kanji) of the search character string "勘定書" is determined (step S30) and a list of searchable dictionaries corresponding to the determined character type (kanji) is read and displayed in a jump destination dictionary list area (not shown) on the explanatory information display screen G on the basis of the table data (see FIG. 3) stored in the jump destination dictionary table memory 22*g* (step S31).

At this time, the preceding jump destination dictionary corresponding to the relevant character type (kanji) stored in the preceding jump dictionary memory 22*h* (see FIG. 4) is set as a specified dictionary and is specified and displayed with the cursor Cu (step S32).

Then, in the jump destination dictionary list area (not shown), when the cursor Cu is moved according to a user operation to select a desired jump destination dictionary (e.g., [Comprehensive Japanese-language Dictionary] and [Translate/Confirm] key 14*c* (KE) is pressed (or touched) (step S33), the selected dictionary name [Comprehensive Japanese-language Dictionary] is caused to correspond to the determined character type (kanji) of the search character string "勘定書" in the preceding jump dictionary memory 22*h* (see FIG. 4) and is registered (step S34).

Then, entry words that completely match the search character string "勘定書" are retrieved from the selected jump destination dictionary [Comprehensive Japanese-language Dictionary] (steps S20, S21 [No]→S23 [Yes]→S23*b*) and a list of the retrieved entry words is displayed in the entry word list area Lm of the main screen 17 (step S23*b*) as shown in FIG. 10D.

At this time, the first entry word "かんじょうーがき [勘定書]" displayed in list form in the entry word list area Lm is specified and displayed h (step S24) and explanatory information corresponding to the entry word "かんじょうーがき [勘定書]" specified and displayed h is read from the jump destination dictionary [Comprehensive Japanese-language Dictionary] and is previewed in the preview area Vp of the main screen 17 (step S25).

Then, when the user selects the desired search entry word (in FIG. 10D, "かんじょうーがき [勘定書]") by operating the cursor keys 14*e* and presses (or touches) [Translate/Confirm] key 14*c* (FE) (step S26), detailed explanatory information read from the [Comprehensive Japanese-language Dictionary] according to the selected entry word "かんじょうーがき [勘定書]" displayed on the explanatory information display screen G spread over the full screen of the main screen 17 (step S27).

As described above, when the preceding dictionary mode (or dictionary select mode) is set for the desired character string "勘定書" in the explanatory information display screen C (text) displayed on the main screen 17, the jump cursor Cu is displayed in the range of the search character string "勘定書" by a stylus touch operation and the stylus is released from the screen, entry words that completely match the search character string "勘定書" are retrieved from the jump destination dictionary (or the user-selected jump destination dictionary) [Comprehensive Japanese-language Dictionary] used in the preceding jump search process according to the character type of the search character string and are displayed in list form in the entry word list area Lm. Then, when the desired entry word "かんじょうーがき [勘定書]" is selected from the entry word list area Lm, specified, and displayed h, and [Translate/Confirm] key 14*c* is operated, detailed explanatory information on the search entry word "かんじょうーがき [勘定書]" is read from the jump destination dictionary [Comprehensive Japanese-language Dictionary] and displayed as a new explanatory information display screen G.

Therefore, when the user wants to know a detailed meaning of a phrase (search character string) in the displayed text in the same manner as in the preceding jump search process or from a dictionary selected by the user, the user has only to set the preceding dictionary mode or dictionary select mode, display the jump cursor Cu in the phase range by a stylus touch operation, and stylus from the screen, enabling a user-friendly jump search to be made without difficulty when the phrase is in a line, particularly when the phrase spans multiple lines.

When the jump cursor Cu is displayed at the head of the search character string according to a key operation and the search character string is jump searched in the longest match order search mode as shown in FIGS. 9A and 9B, or when the jump cursor Cu is displayed in the range of the search character string according to a stylus touch operation and the search character string is jump searched in the complete match mode as shown in FIGS. 10B and 10C, a jump search can, of course, be made by touching the mini-dictionary icon Bm in the jump mode icons BJ to set a mini-dictionary mode.

When the mini-dictionary mode has been set before the search character string is specified by a cursor operation or by a stylus touch operation, a jump search process in the mini-dictionary mode goes through processes in steps S48, S49 (Yes) and performs processes in the mini-dictionary mode in steps S37 to S46. In addition, when the mini-dictionary mode is set after the search character string has been specified by a cursor operation or by a stylus touch operation, a jump search process in the mini-dictionary mode goes through processes in steps S35 (Yes) and S36 and performs processes in the mini-dictionary mode in steps S37 to S46, Hereinafter, a jump search process in the mini-dictionary mode will be explained in detail.

[Jump search in the mini-dictionary mode according to a cursor operation and a stylus touch operation on the book/text viewer screen Gv]

When the user selects a book/text viewer function on a menu screen displayed on the main screen 17 according to the operation of [Menu] key in the dictionary specify keys 14*b*

(Yes in step S51), a list of various types of book data and text data stored in the form of book/text data 22e, 22f is displayed on the main screen 17 (step S52).

On the book/text data list screen, when the user has selected book/text data (e.g., text data [May Day]) the user wants to browse (step S53), the mode is set to a book/text viewer mode (step S54).

Then, the selected book data [May Day] is read from the memory 22 and is displayed as a book/text viewer screen Gv (see FIG. 11A) spread over the full screen of the main screen 17 (step S55).

Even with the book/text viewer screen Gv being displayed, the jump mode icons Bj composed of [Preceding Dictionary] icon Bb, [Dictionary Select] icon Bs, [Mini-dictionary] icon Bm are displayed on the auxiliary screen 16 as in a jump search on the explanatory information display screen G in the normal dictionary search (step S10 [No]→S12).

Then, an arbitrary search character string is specified by a cursor operation or a stylus touch operation on the book/text viewer screen Gv, the jump cursor is displayed, and the preceding dictionary mode, dictionary select mode, or mini-dictionary mode is selected, enabling a jump search process to be performed as on the explanatory information display screen G (steps S9 to S50).

FIGS. 11A, 11B, 11C, 11D, 11E, 11F, 11G, 11H, 11I, and 11J show display operations performed by the touch panel color display module (main screen) 17 and the handwriting input module (auxiliary screen) 16 as a result of an information display process (a jump search in the mini-dictionary mode according to a cursor operation and a stylus touch operation on the book/text viewer screen Gv) at the electronic dictionary device 10.

As shown in FIG. 11A, with text data [May Day] being displayed on the book/text viewer screen Gv, when [Jump] key 14f (KJ) is pressed (or touched) to make a jump to a dictionary to search for an arbitrary character string in the text data (Yes in step S9), it is determined whether the mode is in the normal dictionary search mode (step S10).

If it is determined that the mode is not in the normal dictionary search mode because the mode has been set to the book/text viewer mode (Yes in step S10), the jump mode icons BJ are displayed only on the auxiliary screen 16 and the mode is set to the jump search mode (step S12).

Then, the jump search mode (e.g., dictionary select mode) stored in the jump mode memory 22i is read and the corresponding [dictionary select] icon Bs in the jump mode icons BJ is highlighted for specified display H (step S13).

Then, the jump cursor Cu is displayed at the head of text displayed on the main screen 17 (in this case, the first word "International" on the book/text viewer screen Gv) (step S14).

At this time, the jump cursor Cu can be moved according to a key operation, the mode is set to the longest match order search mode (step S14a [Yes]→S14a1), and a series of character strings (in this case, "International . . . ") from the display position of the jump cursor Cu forward is temporarily store as a jump search character string in the work area (1) 22j (steps S14a2, S14a3).

Here, when the user wants to know only a condensed meaning of the search character string "International" specified by the jump cursor Cu, if the user touches [Mini-dictionary] icon Bm (Yes in step S35), the jump search mode is set to the mini-dictionary mode and stored in the jump mode memory 22i and the [Mini-dictionary] icon Bm is highlighted for specified display H (step S36).

Then, it is determined that the first character type of the search character string "International" is Alphanumeric (step S37, S38 [Yes]), [English-language Mini-dictionary] stored in the mini-dictionary database 22d is specified as a jump destination dictionary (step S39).

Then, when it is determined that the mode is the longest match order search mode, not the complete match search mode (No in step S41), entry words are retrieved from the [English-language Mini-dictionary] specified as the current jump search dictionary in descending order of length of an entry word that matches the search character string "International . . . " and explanatory information corresponding to the first entry word retrieved in the longest match order is read (step S41a).

Then, as shown in FIG. 11B, condensed explanatory information M read from the [English-language Mini-dictionary] is displayed on the auxiliary screen 16 (step S42).

At the right end of the condensed explanatory information M displayed on the auxiliary screen 16, [Scroll] buttons [↑] Ru, [↓] Rd for scrolling displayed information and [Another Candidate] button N for reading and displaying condensed explanatory information M corresponding to an entry word for a next candidate retrieved in the entry word search are also displayed.

As described above, when [Mini-dictionary] icon Bm in the jump mode icons BJ displayed on the auxiliary screen 16 is specified for the desired search character string specified by the jump cursor Cu in the book/text viewer screen Gv displayed on the main screen 17, condensed explanatory information M on an entry word that matches the search character string is read from a condensed dictionary stored in the mini-dictionary database 22d and is replaced with the jump mode icons BJ and displayed on the auxiliary screen 16. Therefore, when the user wants to know easily the meaning of a phrase used in book data or text data now being displayed and browsed, the user can make a user-friendly jump search without difficulty, while the display area of the book/text viewer screen Gv is kept maximized.

Then, when [Return/List] key 14d is pressed (or touched) (Yes in step S46), the book/text viewer screen Gv (main screen 17) on which the present search character string "International" is still specified and the jump mode icons BJ (auxiliary screen 16) are displayed again as shown in FIG. 11A (step S14).

At this time, the jump search mode is kept in the mini-dictionary mode stored in the jump mode memory 22i.

Figure 11C:
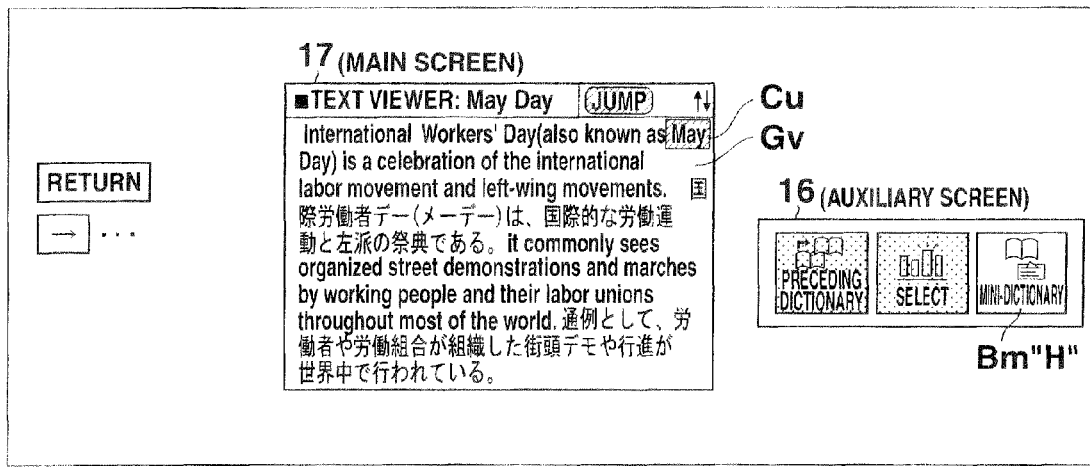

Then, as shown in FIG. 11C, when the jump cursor Cu is moved by operating cursor key [→] 14e on the book/text viewer screen Gv and the first word "May" in the character string "May Day" spanning multiple lines to be jump searched for next is specified, the jump search mode is set to the longest match order search mode and a series of character strings "May Day . . . " from the position of the jump cursor Cu forward is temporarily store as a jump search character string in the work area (1) 22j (steps S14a to S14a3).

Here, when the user wants to make a jump search in the mini-dictionary mode, if the user presses (or touches) [Translate/Confirm] key 14c (KE) (Yes in step S47), the jump search mode stored in the jump mode memory 22i is read (step S48) and it is determined that the present jump search mode is the mini-dictionary mode (Yes in step S49).

Then, it is determined that the first character type of the series of character strings "May Day . . . " temporarily stored in the work area (1) 22j is Alphanumeric (step S37, S38 [Yes]), [English-language Mini-dictionary] stored in the mini-dictionary database 22d is specified as a jump destination dictionary (step S39).

Then, when it is determined that the jump search mode is the mini-dictionary mode and the longest match order search mode, not the complete match search mode (No in step S41), entry words are retrieved from the [English-language Mini-dictionary] specified as the current jump search dictionary in descending order of length of an entry word that matches the search character string "May Day . . . " and explanatory information corresponding to the first entry word retrieved in the longest match order (step S41a).

Figure 11D:
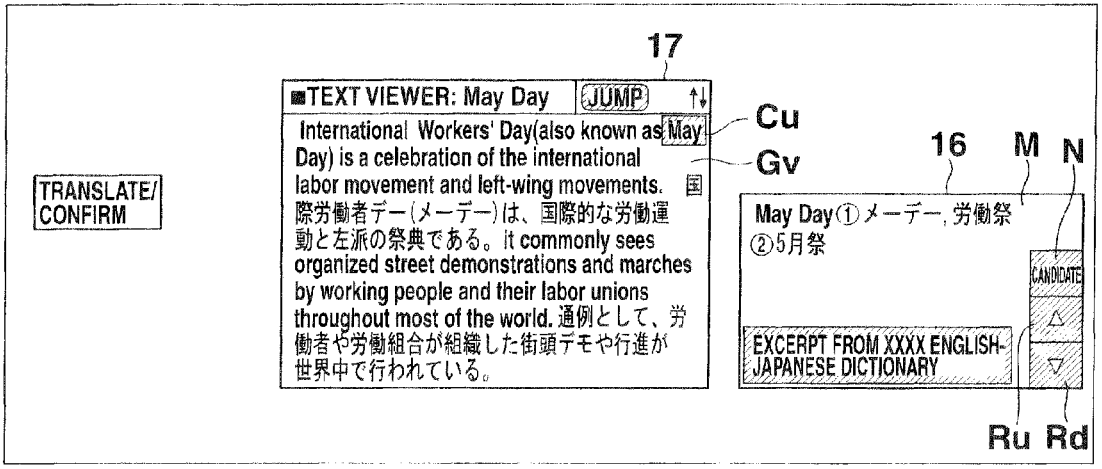

Then, as shown in FIG. 11D, condensed explanatory information M on the first entry word "May Day" read from the [English-language Mini-dictionary] in the longest match is displayed on the auxiliary screen 16 (step S42).

As described above, when the jump cursor Cu is moved on the text displayed on the main screen by operating the cursor keys 14e to specify the first word "May" in the desired search character string "May Day", an entry word "May Day" that longest matches the character string "May Day . . . " from the specified word forward is retrieved from the jump destination dictionary and its explanatory information is displayed. Therefore, a user-friendly jump search can be made without difficulty when a search character string composed of a combination of a plurality of words partially constitutes a line, and particularly when it spans multiple lines.

Figure 11E:
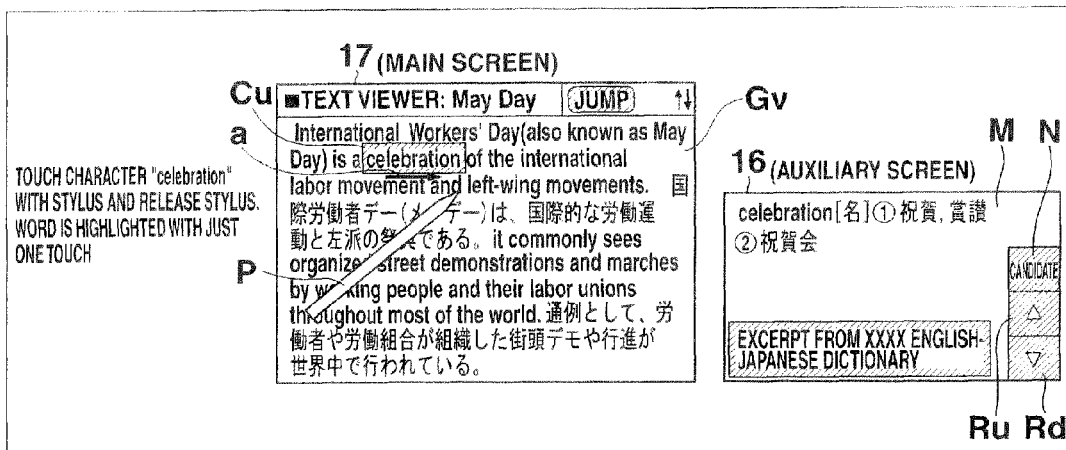

As shown in FIG. 11D, when the first word "May" in the desired search character string "May Day" on the book/text viewer screen Gv (main screen 17) is specified by the jump cursor Cu according to the operation of the cursor keys 14e and the desired search character string "celebration" is touched with the stylus P on the main screen 17 and specified by the jump cursor Cu as shown by arrow a in FIG. 11E after a jump search process has been performed by the longest match search in the mini-dictionary mode (step S43b [Yes]→S14, S14b), the jump search mode is set to the complete match search mode (step S14b1) and the specified character string "celebration" is stored temporarily as a jump search character string in the work area (1) 22j (step S14b2).

Then, the stylus is released from the character string "celebration" on the main screen (Yes in step S14b3), the jump search mode stored in the jump mode memory 22i is read (step S48) and it is determined that the present jump search mode is the mini-dictionary mode (Yes in step S49).

Then, it is determined that the first character type of the search character string "celebration" temporarily stored in the work area (1) 22j is Alphanumeric (step S37, S38 [Yes]), and [English-language Mini-dictionary] stored in the mini-dictionary database 22d is specified as a jump destination dictionary (step S39).

Then, when it is determined that the jump search mode is the mini-dictionary mode and in the complete match search mode (Yes in step S41), an entry word that completely matches the search character string "celebration" is retrieved from the [English-language Mini-dictionary] specified as the current jump search dictionary and explanatory information corresponding to the first entry word retrieved in the complete match is read (step S41b).

Then, as shown in FIG. 11E, condensed explanatory information M on the first entry word "celebration" read from the [English-language Mini-dictionary] in the complete match is displayed on the auxiliary screen 16 (step S42).

As described above, when the jump cursor Cu is specified and displayed in the range of the desired search character string "celebration" by a stylus touch operation, an entry word "celebration" that completely matches the search character string is retrieved from the jump destination dictionary and its explanatory information is displayed. Therefore, a user-friendly jump search can be made without difficulty when the search character string spans multiple lines, and particularly when it partially constitutes a line.

Figure 11F:
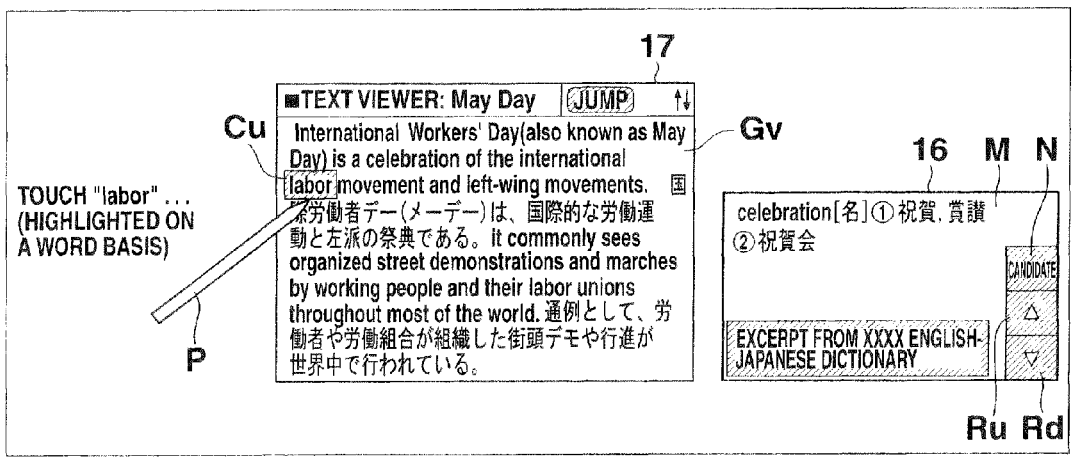
Figure 11G:
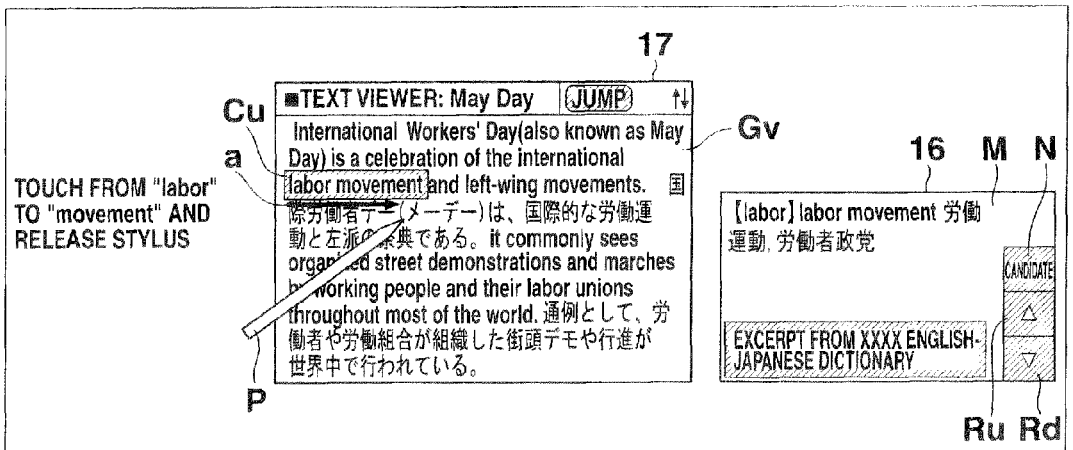

Then, as shown in FIG. 11F and by arrow a of FIG. 11G, when the range of a character string "labor movement" composed of a plurality of words on the book/text viewer screen Gv (main screen 17) is touched with the stylus P, causing the jump cursor Cu to be displayed over the range (step S43b [Yes]→S14, S14b), the mode is set to the complete match search mode (step S14b1) and the series of character strings "labor movement" touched with the stylus is held temporarily as a jump search character string in the work area (1) 22j (step S14b2).

Then, when the stylus P is released from the main screen 17 (Yes in step S14b3), the jump search mode stored in the jump mode memory 22i is read (step S48) and it is determined that the present jump search mode is the mini-dictionary mode (Yes in step S49).

Then, as in the jump search process in the complete match mode in the preceding mini-dictionary mode, it is determined that the character type of the search character string "labor movement" is Alphanumeric (step S37, S38 [Yes]), [English-language Mini-dictionary] stored in the mini-dictionary database 22d is specified as a jump destination dictionary (step S39).

Then, when it is determined that the jump search mode is the mini-dictionary mode and in the complete match search mode (Yes in step S41), an entry word that completely matches the search character string "labor movement" is retrieved from the [English-language. Mini-dictionary] specified as the current jump search dictionary and explanatory information corresponding to the first entry word retrieved in the complete match is read (step S41b).

Then, as shown in FIG. 11C, condensed explanatory information M on the first entry word "labor movement" read from the [English-language Mini-dictionary] in the complete match is displayed on the auxiliary screen 16 (step S42).

As described above, when the jump cursor Cu is specified and displayed in the range of the search character string "labor movement" composed of a plurality of words by a stylus touch operation on the text displayed on the main screen 17, an entry word "labor movement" that completely matches the search character string is retrieved from the jump destination dictionary and its explanatory information is displayed. Therefore, a user-friendly jump search can be made without difficulty particularly when the search character string partially constitutes a line.

Furthermore, in the complete match search mode in the mini-dictionary mode, each time the range of the desired search character string in the text displayed on the main screen 17 is traced by a stylus touch operation and specified by the jump cursor Cu, an entry word that completely matches the search character string in the specified range is retrieved from the [English-language Mini-dictionary] or [Japanese-language Mini-dictionary] corresponding to the first character type of the search character string, and its condensed explanatory information H is displayed on the auxiliary screen 16. Therefore, the user can specify various phrases in text displayed on the main screen 17 whose condensed meanings the user wants to know with a stylus P one after another to display their condensed explanatory information M on the auxiliary screen 16.

Figure 11H:
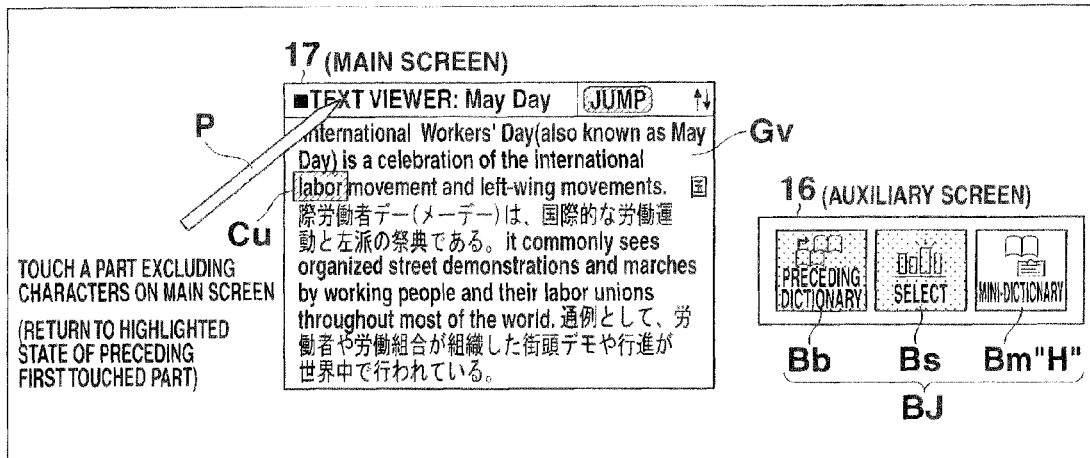

As shown in FIGS. 11F and 11G, after the search character string "labor movement" in the text on the main screen 17 has been specified by the jump cursor Cu, making a jump search in the mini-dictionary mode, when [Return/List] key 14d is operated (Yes in step S46) or as shown in FIG. 11H, when an area excluding the bock/text viewer screen Gv on the main screen 17 is touched with the stylus (Yes in step S43b), the jump cursor Cu is displayed again on the character string "labor" touched and specified with the stylus on the preceding main screen 17 (see FIGS. 11F and 11G) (step S14).

Figure 11I:
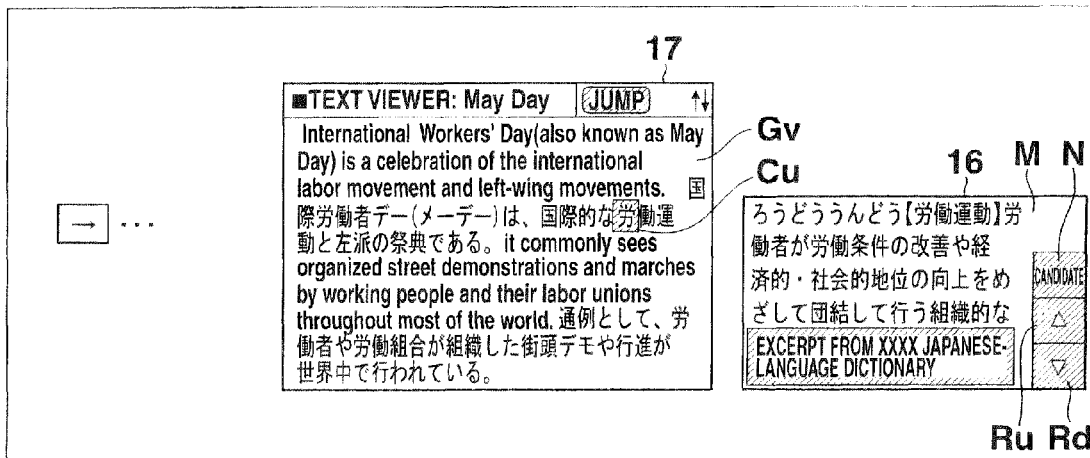

Here, as shown in FIG. 11I, when the jump cursor Cu is moved to the first character "労" (pronounced "rou" in Japanese) in the desired search character string "労働運動" (pronounced "rou-dou-un-dou" in Japanese) by operating cursor key [→] 14e, the jump search mode is set to the longest match order search mode and a series of character strings "労働運動 . . . " from the position of the jump cursor Cu forward is temporarily store as a jump search character string in the work area (1) 22j (steps S14a to S14a3).

Then, [Translate/Confirm] key 14c (NE) is pressed (or touched) (Yes in step S47), the jump search mode stored in the jump mode memory 22i is read (step S48) and it is determined that the present jump search mode is the mini-dictionary mode (Yes in step S49).

Then, it is determined that the first character type of the series of character strings "労働運動 . . . " temporarily stored in the work area (1) 22j is not Alphanumeric (is kana/kanji) (step S37, S38 [No]), [Japanese-language Mini-dictionary] stored in the mini-dictionary database 22d is specified as a jump destination dictionary (step S40).

Then, when it is determined that the jump search mode is the mini-dictionary mode and the longest match order search mode, not the complete match search mode (No in step S41), entry words are retrieved from the [Japanese-language Mini-dictionary] specified as the current jump search dictionary in descending order of length of an entry word that matches the search character string "労働運動 . . . " and explanatory information corresponding to the first entry word retrieved in the longest match order is read (step S41a).

Then, as shown in FIG. 11I, condensed explanatory information M on the first entry word "労働運動" (pronounced "rou-dou-un-dou" in Japanese) read from the [Japanese-language Mini-dictionary] in the longest match is displayed on the auxiliary screen 16 (step S42).

As described above, when the jump cursor Cu is moved on the text displayed on the main screen 17 by operating the cursor keys 14e to specify the first word "労" in the desired search character string "労働運動", an entry word "労働運動" that longest matches the character string from the specified character forward is retrieved from the jump destination dictionary and its explanatory information is displayed. Therefore, a user-friendly jump search can be made without difficulty when a search character string composed of a combination of a plurality of phrases partially constitutes a line, and particularly when it spans multiple lines.

Figure 11J:
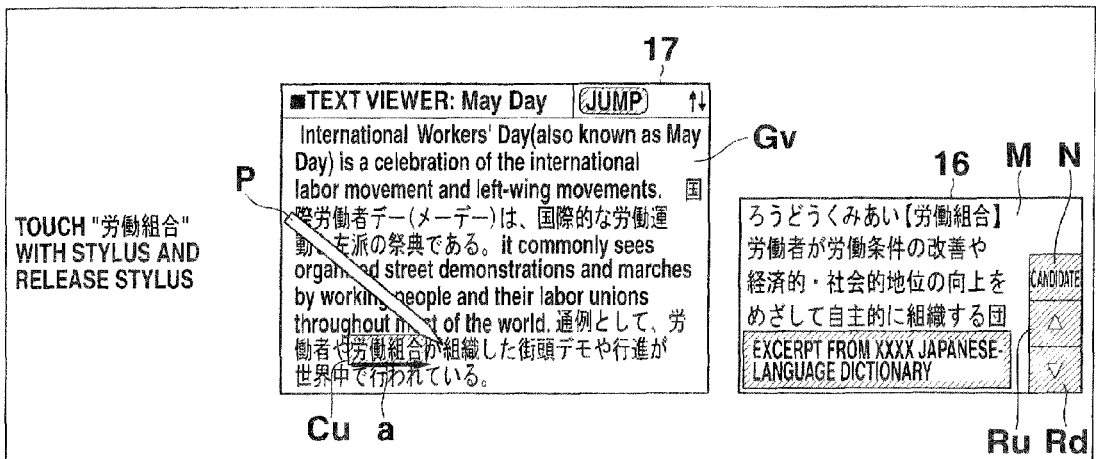

Then, as shown by arrow a of FIG. 11J, when the range of the desired search character string "労働組合" (pronounced "rou-dou-kumi-ai" in Japanese) displayed on the book/text viewer screen Gv is touched with the stylus P, causing the jump cursor Cu to be displayed over the range (step S43b [Yes]→S14, S14b), the mode is set to the complete match search mode (step S14b1) and the series of character strings "労働組合" touched with the stylus is held temporarily as a jump search character string in the work area (1) 22j (step S14b2).

Then, when the stylus P is released from the main screen 17 (Yes in step S14b3), the jump search mode stored in the jump mode memory 22i is read (step S48) and it is determined that the present jump search mode is the mini-dictionary mode (Yes in step S49).

Then, it is determined that the character type of the search character string "労働組合" is not Alphanumeric (is kana/kanji) (step S37, S38 [No]), [Japanese-language Mini-dictionary] stored in the mini-dictionary database 22d is specified as a jump destination dictionary (step S40).

Then, when it is determined that the jump search mode is the mini-dictionary mode and in the complete match search mode (Yes in step S41), an entry word that completely matches the search character string "労働組合" (pronounced "rou-dou-kumi-ai" in Japanese) is retrieved from the [Japanese-language Mini-dictionary] specified as the current jump search dictionary and explanatory information corresponding to the first entry word retrieved in the complete match is read (step S41b).

Then, as shown in FIG. 11J, condensed explanatory information M on the first entry word "労働組合" read from the [Japanese-language Mini-dictionary] in the complete match is displayed on the auxiliary screen 16 (step S42).

As described above, when the jump cursor Cu is specified and displayed in the range of the search character string "労働組合" composed of a plurality of phrases by a stylus touch operation on the text displayed on the main screen 17, an entry word "労働組合" that completely matches the character string "労働組合" in the range touched with the stylus is retrieved from the jump destination dictionary and its explanatory information is displayed. Therefore, a user-friendly jump search can be made without difficulty particularly when the search character string partially constitutes a line.

With condensed explanatory information M jump-searched in the mini-dictionary mode being displayed on the auxiliary screen 16 (see FIGS. 11A to 11J), when [Another candidate] button N is touched displayed at the right end of the auxiliary screen 16 (step S43a [Yes]→S44 [Yes]), condensed explanatory information M corresponding to a next candidate entry word retrieved in the longest match order in step S41a or to a next candidate entry word retrieved in the complete match in step S41b is read from the corresponding English-language or Japanese-language [Mini-dictionary] (step S44a) and is rewritten and displayed on the auxiliary screen 16 (step S42).

With condensed explanatory information M being displayed on the auxiliary screen 16 (see FIGS. 11A to 11J), when [Scroll] button [↑] Ru/[↓] Rd displayed at the right end of the auxiliary screen 16 is touched (step S43a [Yes]→S45 [Yes]), condensed explanatory information M read from the English-language or Japanese-language [Mini-dictionary] and displayed on the auxiliary screen 16 is displayed, being scrolled upward with [↑] Ru or scrolled downward with [↓] Rd (step S45a, S42).

Accordingly, with the jump search function of the electronic dictionary device 10 with the above configuration, when the head of a desired character string in text displayed on the main screen 17 is specified by the jump cursor Cu moved according to the operation of the cursor keys 14e, the longest match order search mode is set and a series of character strings from the character specified by the jump cursor forward is set as a search character string. Then, entry words retrieved from a jump destination dictionary specified according to the preceding dictionary mode, the dictionary select mode, or the mini-dictionary mode in descending order of length of an entry word that matches the series of search character strings are displayed in list form, and explanatory information on an entry word selected from the entry word list is read from the corresponding dictionary and displayed. On the other hand, when the range of the desired character string in text is specified by the jump cursor Cu displayed according to a stylus touch operation of the stylus P, the complete match search mode is set and a series of character strings specified by the jump cursor is set as a search character string. Then, entry words that completely match the series of search character strings retrieved from a jump destination dictionary specified according to the preceding dictionary mode, the dictionary select mode, or the mini-dictionary mode are displayed in list form, and explanatory information on an entry word selected from the entry word list is read from the corresponding dictionary and displayed.

Therefore, a search character string that spans multiple lines from the end of a line to the head of another line can be jump-searched for very easily by just causing the jump cursor Cu to move to the head of the character string according to the key operation. In addition, a search character string that partially constitutes a line can be jump-searched for in a very simple manner by just causing the jump cursor to be displayed in the range of the character string according to the stylus touch operation.

When the jump cursor Cu is displayed at the head of a search character string according to the key operation, entry words are retrieved in descending order of length of an entry word that matches a series of character strings from the lump cursor Cu forward. On the other hand, when the jump cursor Cu is displayed in the range of a search character string according to a stylus touch operation, an entry word that completely matches a series of character strings in the range in which the jump cursor Cu is displayed is retrieved.

Therefore, a search character string of an idiom composed of a combination of a plurality of words or phrases can be jump searched for easily by both a key operation and a stylus touch operation. Particularly by a key operation, a search character string of an idiom that spans multiple lines can be jump searched for very easily.

In addition, with the jump search function of the electronic dictionary device 10 with the above configuration, when a search character string in text displayed on the main screen 17 is specified by the key operation or stylus touch operation in the preceding dictionary mode or dictionary select mode, detailed explanatory information on an entry word retrieved from a normal dictionary at the jump destination specified according to the setting mode is displayed in full screen, replacing the text now being displayed on the main screen 17. On the other hand, when a search character string in text displayed on the main screen 17 is specified, condensed explanatory information N on an entry word retrieved from a condensed dictionary at the jump destination specified according to the mini-dictionary mode is displayed on the auxiliary screen 16.

Therefore, when a jump search is made in the mini-dictionary mode, condensed explanatory information on the search character string specified in the text can be seen on the auxiliary screen 16, while text is being displayed on the main screen 17.

Furthermore, with the jump search function of the electronic dictionary device 10, when the range of a search character string in text displayed on the main screen 17 is specified by the stylus touch operation, it is determined that the stylus has been released from the main screen 17 and an entry word that completely matches the search character string starts to be retrieved from the jump destination dictionary and explanatory information on the retrieved entry word is displayed.

Therefore, in the mini-dictionary mode, each time the range of a search character string in text displayed on the main screen 17 is specified by a stylus touch operation and the stylus is released from the main screen 17, condensed explanatory information M on the entry word retrieved in the complete match search from the jump destination condensed dictionary corresponding to the search character string can be displayed one after another on the auxiliary screen 16.

The methods of the individual processes performed by the electronic dictionary device 10 and the databases written in the embodiments, including the information display process (part 1) shown in the flowchart of FIG. 5, the information display process (part 2) shown in the flowchart of FIG. 6, the information display process (part 3) shown in the flowchart of FIG. 7, and the information display process (part 4) shown in the flowchart of FIG. 8, and the dictionary databases 22b to 22d, can be stored in the external storage mediums 23, such as a memory card (e.g., a ROM card or a RAM card), a magnetic disk (e.g., a floppy disk or a hard disk), an optical disk (e.g., a CD-ROM or a DVD), or a semiconductor memory, in the form of programs the computer can execute. Then, the mediums 23 can be delivered. The computer (CPU 11) of an electronic device loads the program stored in the external storage medium 23 into the memory (22). The computer is controlled by the read-in program, thereby realizing the information display function involving a jump search explained in the embodiments, which enables the same processes in the aforementioned methods as explained to be carried out.

Furthermore, the data of the programs which realize the above methods can be transferred in the form of program code through a network N. The program data can be loaded into a computer connected to the network N by the communication control module 25, thereby realizing the information display function involving the jump search.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic dictionary device comprising:
a dictionary storage module which stores a dictionary that causes a plurality of entry words to correspond to explanations of the entry words;
a touch panel display module which displays text;
a cursor specify module which specifies one character of a character string in text displayed on the touch panel display module according to a cursor operation;
a touch specify module which specifies a character string in text displayed on the touch panel display module according to a touch operation;
a cursor touch determine module which determines whether: (i) one character of the character string in the displayed text is specified according to the cursor operation, or (ii) a character string in the displayed text is specified according to the touch operation, wherein a character type of the specified text is determined to set an appropriate one of a Japanese-language dictionary database and an English-language dictionary database as the dictionary for retrieving explanations of entry words;
a longest length match order search mode setting module which sets a longest length match order search mode when it is determined by the cursor touch determine module that said one character in the displayed text is specified according to the cursor operation;
a complete match mode setting module which sets a complete match mode when it is determined by the cursor touch determine module that the character string in the displayed text is specified according to the touch operation; and
a search module which: (i) when the longest length match order search mode is set by the longest length match order search mode setting module, retrieves entry words in the dictionary stored in the dictionary storage module in descending order of length of an entry word that matches the character string whose first character is said one character in the displayed text specified by the cursor specify module, and (ii) when the complete match mode is set by the complete match mode setting module, retrieves an entry word that matches the character string in the displayed text specified by the touch specify module from the dictionary stored in the dictionary storage module; and
wherein search module displays an explanation of a retrieved entry word.

2. The electronic dictionary device of claim 1, wherein the dictionary storage module stores a normal dictionary that causes a plurality of entry words to correspond to detailed explanations of the entry words and a condensed dictionary that causes a plurality of entry words to correspond to condensed explanations of the entry words,
wherein the electronic dictionary device further comprises:
a search dictionary setting module which sets either the normal dictionary or the condensed dictionary stored in the dictionary storage module as a dictionary to be retrieved according to a user operation, and
an auxiliary-display module different from the touch panel display module,
wherein the search module retrieves the entry word in accordance with a specification by the cursor specify module or the touch specify module from the dictionary set by the search dictionary setting module, and
wherein when the search dictionary setting modules sets the normal dictionary as the dictionary to be retrieved, the search module displays text of a detailed explanation corresponding to the entry word retrieved from the normal dictionary by the search module, replacing text being displayed on the touch panel display module and, when the search dictionary setting module sets the condensed dictionary as the dictionary to be retrieved, the search module displays text of a condensed explanation corresponding to the entry word retrieved from the condensed dictionary.

3. The electronic dictionary device of claim 2, wherein when the touch specify module specifies a character in the displayed text, the search module starts to search for an entry word that matches a specified character string in the displayed text according to the touch operation when it is determined that the touch operation has been completed.

4. The electronic dictionary device of claim 1, wherein the touch panel display module displays the text spanning multiple lines; and
wherein the search module is a multiple line search module which, when it is determined by the cursor touch determine module that said one character of the character string in the displayed text is specified according to the cursor operation and when the longest length match order search mode is set by the longest length match order search mode setting module, retrieves an entry word in the dictionary stored in the dictionary storage module in the descending order of length of the entry word that matches the character string spanning multiple lines from said one character in the specified text.

5. An electronic dictionary device comprising:
a dictionary storage module which stores a dictionary that causes a plurality of entry words to correspond to explanations of the entry words;
a touch panel display module which displays text;
a cursor specify module which specifies one word in text displayed on the touch panel display module according to a cursor operation;
a touch specify module which specifies a character string in text displayed on the touch panel display module according to a touch operation;
a cursor touch determine module which determines whether: (i) one word of a series of words in the displayed text is specified according to the cursor operation, or (ii) a character string in the displayed text is specified according to the touch operation, wherein a character type of the specified text is determined to set an appropriate one of a Japanese-language dictionary database and an English-language dictionary database as the dictionary for retrieving explanations of entry words;
a longest length match order search mode setting module which sets a longest length match order search mode when it is determined by the cursor touch determine module that said one word in the displayed text is specified according to the cursor operation;
a complete match mode setting module which sets a complete match mode when it is determined by the cursor touch determine module that the character string in the displayed text is specified according to the touch operation; and
a search module which: (i) when the longest length match order search mode is set by the longest length match order search mode setting module, retrieves entry words in the dictionary stored in the dictionary storage module in descending order of length of an entry word that matches the series of words whose first word is said one word in the displayed text specified by the cursor specify module, and (ii) when the complete match mode is set by the complete match mode setting module, retrieves an entry word that matches the character string in the displayed text specified by the touch specify module from the dictionary stored in the dictionary storage module; and
wherein the search module displays an explanation of a retrieved entry word.

6. The electronic dictionary device of claim 5, wherein the touch panel display module displays the text spanning multiple lines; and
wherein the search module is a multiple line search module which, when it is determined by the cursor touch determine module that said one word in the displayed text is specified according to the cursor operation and when the longest length match order search mode is set by the longest length match order search mode setting module, retrieves an entry word in the dictionary stored in the dictionary storage module in the descending order of length of the entry word that matches the series of words spanning multiple lines from said one word in the specified text.

7. A dictionary search method of an electronic device which comprises a dictionary storage module which stores a dictionary that causes a plurality of entry words to correspond to explanations of the entry words, a touch panel display module which displays text, a cursor specify module which specifies one character of a character string in text displayed on the touch panel display module according to a cursor operation, and a touch specify module which specifies a character string in text displayed on the touch panel display module according to a touch operation, the dictionary search method comprising:

determining whether: (i) one character of the character string in the displayed text is specified according to the cursor operation, or (ii) a character string in the displayed text is specified according to the touch operation, wherein a character type of the specified text is determined to set an appropriate one of a Japanese-language dictionary database and an English-language dictionary database as the dictionary for retrieving explanations of entry words;

setting a longest length match order search mode when it is determined that said one character in the displayed text is specified according to the cursor operation;

setting a complete match mode when it is determined that the character string in the displayed text is specified according to the touch operation;

when the longest length match order search mode is set, retrieving entry words in the dictionary stored in the dictionary storage module in descending order of length of an entry word that matches the character string whose first character is said one character in the displayed text specified by the cursor specify module;

when the complete match mode is set, retrieving an entry word that matches the character string in the displayed text specified by the touch specify module from the dictionary stored in the dictionary storage module; and displaying an explanation of a retrieved entry word.

8. A non-transitory computer-readable storage medium having stored thereon a program for controlling a computer of an electronic device which comprises a dictionary storage module which stores a dictionary that causes a plurality of entry words to correspond to explanations of the entry words, a touch panel display module which displays text, a cursor specify module which specifies one character of a character string in text displayed on the touch panel display module according to a cursor operation, and a touch specify module which specifies a character string in text displayed on the touch panel display module according to a touch operation, wherein the program causes the computer to perform functions comprising:

determining whether: (i) one character of the character string in the displayed text is specified according to the cursor operation, or (ii) a character string in the displayed text is specified according to the touch operation, wherein a character type of the specified text is determined to set an appropriate one of a Japanese-language dictionary database and an English-language dictionary database as the dictionary for retrieving explanations of entry words;

setting a longest length match order search mode when it is determined that said one character in the displayed text is specified according to the cursor operation;

setting a complete match mode when it is determined that the character string in the displayed text is specified according to the touch operation;

when the longest length match order search mode is set, retrieving entry words in the dictionary stored in the dictionary storage module in descending order of length of an entry word that matches the character string whose first character is said one character in the displayed text specified by the cursor specify module;

when the complete match mode is set, retrieving an entry word that matches the character string in the displayed text specified by the touch specify module from the dictionary stored in the dictionary storage module; and displaying an explanation of a retrieved entry word.

9. A dictionary search method of an electronic device which comprises a dictionary storage module which stores a dictionary that causes a plurality of entry words to correspond to explanations of the entry words, a touch panel display module which displays text, a cursor specify module which specifies one word in text displayed on the touch panel display module according to a cursor operation, and a touch specify module which specifies a character string in text displayed on the touch panel display module according to a touch operation, the dictionary search method comprising:

determining whether: (i) one word of a series of words in the displayed text is specified according to the cursor operation, or (ii) a character string in the displayed text is specified according to the touch operation, wherein a character type of the specified text is determined to set an appropriate one of a Japanese-language dictionary database and an English-language dictionary database as the dictionary for retrieving explanations of entry words;

setting a longest length match order search mode when it is determined that said one word in the displayed text is specified according to the cursor operation;

setting a complete match mode when it is determined that the character string in the displayed text is specified according to the touch operation;

when the longest length match order search mode is set, retrieving entry words in the dictionary stored in the dictionary storage module in descending order of length of an entry word that matches the series of words whose first word is said one word in the displayed text specified by the cursor specify module;

when the complete match mode is set, retrieving an entry word that matches the character string in the displayed text specified by the touch specify module from the dictionary stored in the dictionary storage module; and displaying an explanation of a retrieved entry word.

10. A non-transitory computer-readable recording medium having stored thereon a program for controlling a computer of an electronic device which comprises a dictionary storage module which stores a dictionary that causes a plurality of entry words to correspond to explanations of the entry words, a touch panel display module which displays text, a cursor specify module which specifies one word in text displayed on the touch panel display module according to a cursor operation, and a touch specify module which specifies a character string in text displayed on the touch panel display module according to a touch operation, wherein the program causes the computer to perform functions comprising:

determining whether: (i) one word of a series of words in the displayed text is specified according to the cursor operation, or (ii) a character string in the displayed text is specified according to the touch operation, wherein a character type of the specified text is determined to set an appropriate one of a Japanese-language dictionary database and an English-language dictionary database as the dictionary for retrieving explanations of entry words;

setting a longest length match order search mode when it is determined that said one word in the displayed text is specified according to the cursor operation;

setting a complete match mode when it is determined that the character string in the displayed text is specified according to the touch operation;

when the longest length match order search mode is set, retrieving entry words in the dictionary stored in the dictionary storage module in descending order of length of an entry word that matches the series of words whose first word is said one word in the displayed text specified by the cursor specify module;

when the complete match mode is set, retrieving an entry word that matches the character string in the displayed text specified by the touch specify module from the dictionary stored in the dictionary storage module; and displaying an explanation of a retrieved entry word.

* * * * *